(12) United States Patent
Szarkowski et al.

(10) Patent No.: US 7,650,979 B2
(45) Date of Patent: Jan. 26, 2010

(54) BALL TRANSFER DEVICE

(75) Inventors: Stephen D. Szarkowski, Pueblo, CO (US); Rodney R. Mishmash, Pueblo, CO (US); David M. Pruett, Canon City, CO (US); Raymond D. Middlemiss, Canon City, CO (US); Ernest L. Klemm, Canon City, CO (US)

(73) Assignee: Portec, Inc., Canon City, CO (US)

( * ) Notice: Subject to any disclaimer, the term of this patent is extended or adjusted under 35 U.S.C. 154(b) by 0 days.

(21) Appl. No.: 11/792,550

(22) PCT Filed: Dec. 6, 2005

(86) PCT No.: PCT/US2005/044188

§ 371 (c)(1),
(2), (4) Date: Mar. 31, 2008

(87) PCT Pub. No.: WO2006/063013

PCT Pub. Date: Jun. 15, 2006

(65) Prior Publication Data

US 2008/0271972 A1    Nov. 6, 2008

Related U.S. Application Data

(60) Provisional application No. 60/634,787, filed on Dec. 8, 2004, provisional application No. 60/642,791, filed on Jan. 10, 2005, provisional application No. 60/701,901, filed on Jul. 22, 2005.

(51) Int. Cl.
*B65G 13/00* (2006.01)
(52) U.S. Cl. .............................................. 193/35 MD
(58) Field of Classification Search ................. 198/782; 193/35 MD; 384/49
See application file for complete search history.

(56) References Cited

U.S. PATENT DOCUMENTS

| | | | | |
|---|---|---|---|---|
| 4,553,795 A | * | 11/1985 | Takagi | 193/35 MD |
| 4,660,994 A | | 4/1987 | Masciarelli | |
| 4,732,490 A | * | 3/1988 | Masciarelli | 193/35 MD |
| 5,375,679 A | | 12/1994 | Biehl | |
| 6,019,211 A | * | 2/2000 | Masciarelli, Jr. | 193/35 MD |
| 6,457,865 B1 | * | 10/2002 | Masciarelli, Jr. | 193/35 MD |
| 6,516,934 B2 | * | 2/2003 | Masciarelli, Jr. | 193/35 MD |

* cited by examiner

*Primary Examiner*—James R Bidwell
(74) *Attorney, Agent, or Firm*—Klaas, Law, O'Meara & Malkin, P.C.

(57) ABSTRACT

A ball transfer device is disclosed herein. An embodiment of the ball transfer device includes a chamber, wherein a first opening and a second opening extend into the chamber. A ball is located between the first opening and the second opening and is movable within the chamber. The movement extends between a first position and as second position, wherein a portion of the ball is movable into the first opening when the ball is in the first position.

21 Claims, 20 Drawing Sheets

BALL TRANSFER DEVICE

This application claims the benefit of U.S. Provisional Application(s) No(s) 60/634,787 filed Dec. 8, 2004 and 60/642,791 filed Jan. 10, 2005 and 60/701,901 filed Jul. 22, 2005 and incorporates the same by reference.

Conveyor systems are used to transport items between different locations. Items may be goods produced by factories or articles transported within factories, distribution centers, airports, and other facilities. Uses of conveyor systems include factories and distribution centers. Factories that produce large quantities of goods typically have to move the goods at a high rate of speed in order to be efficient. Likewise, distribution centers are typically required to move goods quickly in order to be efficient.

The speed of belt-type conveyor systems is limited. When the belts reach a high speed, they tend to become unstable, which may cause them to fail. The failure will stop the conveyor system and may damage the items and injure persons proximate the conveyor system.

Many conveyors have to change the direction of items. Direction changes are typically accomplished by using a curved conveyor section. These curved conveyor sections also have limitations as to the speed in which items may be transported. High speed belts used as conveyors typically become more unstable when they are used in a curved conveyor situation. Another limitation is that centripetal force causes the items to contact a wall portion of the curve, which slows the items.

A ball transfer device is disclosed herein. An embodiment of the ball transfer device includes a chamber, wherein a first opening and a second opening extend into the chamber. A ball is located between the first opening and the second opening and is movable within the chamber. The movement extends between a first position and a second position, wherein a portion of the ball is movable into the first opening when the ball is in the first position.

Figure 1:
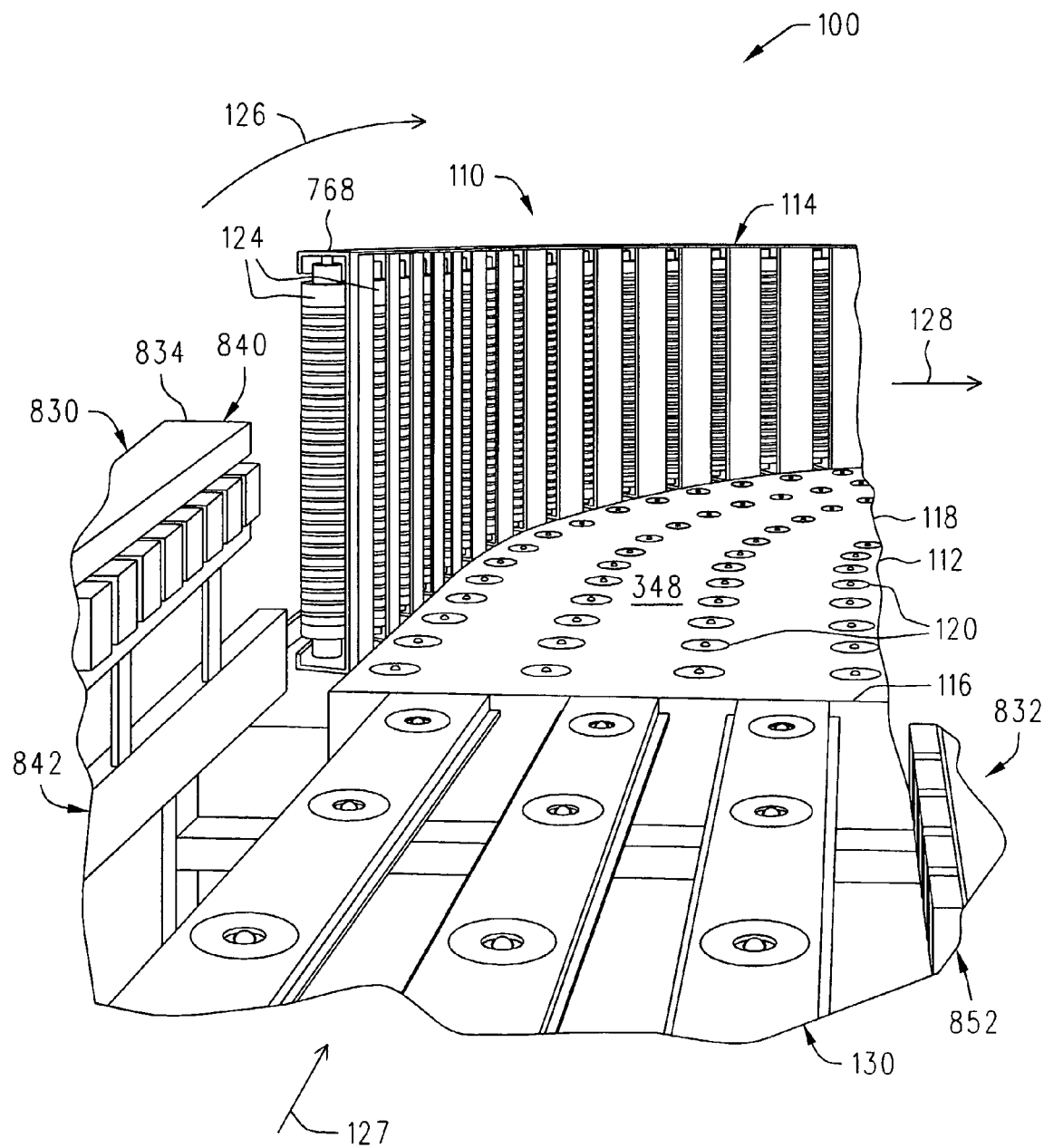
FIG. 1 is a top perspective view embodiment of a conveyor system.

A top perspective view of a conveyor system 100 is shown in FIG. 1. The conveyor system 100 includes several components that are described in greater detail below. The conveyor system includes a curved portion 110 that includes a platform 112 and a wall 114. The curved portion includes a first end 116 and a second end 118 wherein items travel from the first end 116 to the second end 118. As described in greater detail, the platform 112 includes a plurality of ball transfer units 120 that facilitate the movements of items.

A plurality of embodiments of the wall 114 are described herein. The wall facilitates changing the direction of items moving along the conveyor system 100. More specifically, the items move along the curve of the wall 114 and may do so without significantly reducing their velocities. The curve of the wall 114 is referred to as an arcuate path 126. The arcuate path 126 causes items to change directions from a first linear direction 127 to a second linear direction 128. The devices associated with the wall 114 may also increase or decrease the velocities of the items as required by a user. In the embodiment of the conveyor system 100 of FIG. 1, the devices are air-cooled pulleys 124. In other embodiments, the devices are ball transfer units located along or within the wall 114.

The embodiment of the conveyor 100 of FIG. 1 also includes an accelerator 130 located proximate or connected to the first end 116 of the curved portion 110. The accelerator 130 serves to accelerate and/or decelerate items. It should be noted that the accelerator 130 is an embodiment of a conveyor section that moves items to the curved portion 110. As with the other components of the conveyor system 100, the accelerator 130 is described in greater detail below.

Ball Transfer Units

The description of the conveyor system 100 will begin with the ball transfer units 120 as they may be used on the platform 112 and the wall 114. An embodiment of a ball transfer unit 200 is shown in greater detail in FIG. 2. The ball transfer unit 200 is an example of the plurality of ball transfer units 120 of FIG. 1. The ball transfer unit 200 may include a ball or sphere, such as the ball 210 shown in conjunction with the ball unit 200. The ball 210 of the ball transfer unit 200 is able to rotate in any direction relative the ball transfer unit 200 in a manner that will be described in further detail herein. Accordingly, a plurality of ball transfer units 120, FIG. 1, are able to support the weight of an item being conveyed and yet allow the item to move in any direction.

As can be appreciated from the above description, and with reference again to FIG. 1, the plurality of ball transfer units 120 allow an item, such as a tote, being conveyed thereon to move in the direction of the arcuate path 126 of the wall 114 while being fully supported. The wall 114 of the curved portion 110 forces the items to follow the arcuate path 126 and thus change from the first linear direction 127 to the second linear direction 128. It is noted that the ball transfer units 120 are shown in a generally round configuration herein for exemplary illustrative purposes only. The ball transfer units 120 could alternatively be formed having virtually any shape, for example, a shape that is more closely chosen to fit the desired curve.

Referring again to FIG. 2, the ball transfer unit 200, which is sometimes simply referred to as the ball unit 200, may generally include a cup portion 212 and a cap or lid portion 214 threadingly attached to the cup portion 212. Other mechanisms, such as adhesives may also secure the cup portion 212 to the lid portion 214. A pair of bearings 216A, 216B may be housed within cup portion 212 as shown and the ball 210 may be moveably received within the bearings 216A, 216B. The bearings 216A, 216B are described in greater detail below.

Figure 2:
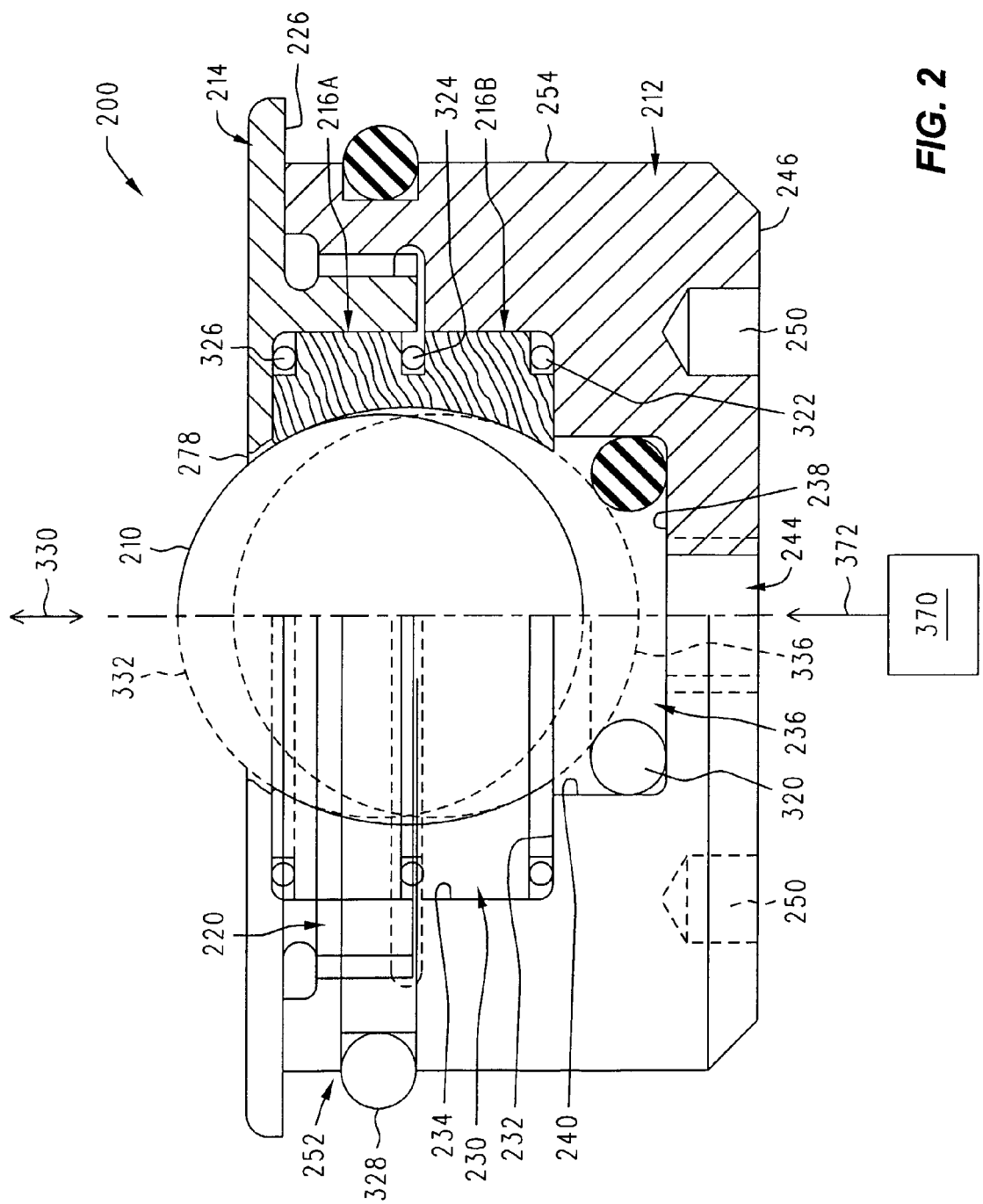
FIG. 2 is an elevational partial cross-sectional view of a ball unit of the ball transfer device of FIG. 1.
Figure 3:
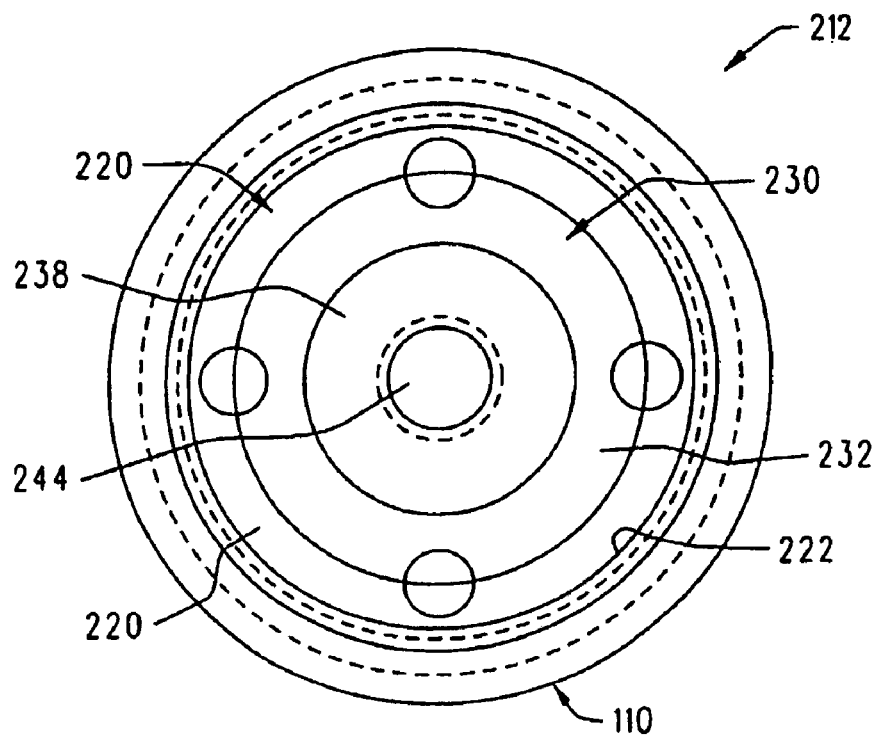
FIG. 3 is a top plan view of a cup portion of the ball unit of FIG. 2.
Figure 4:
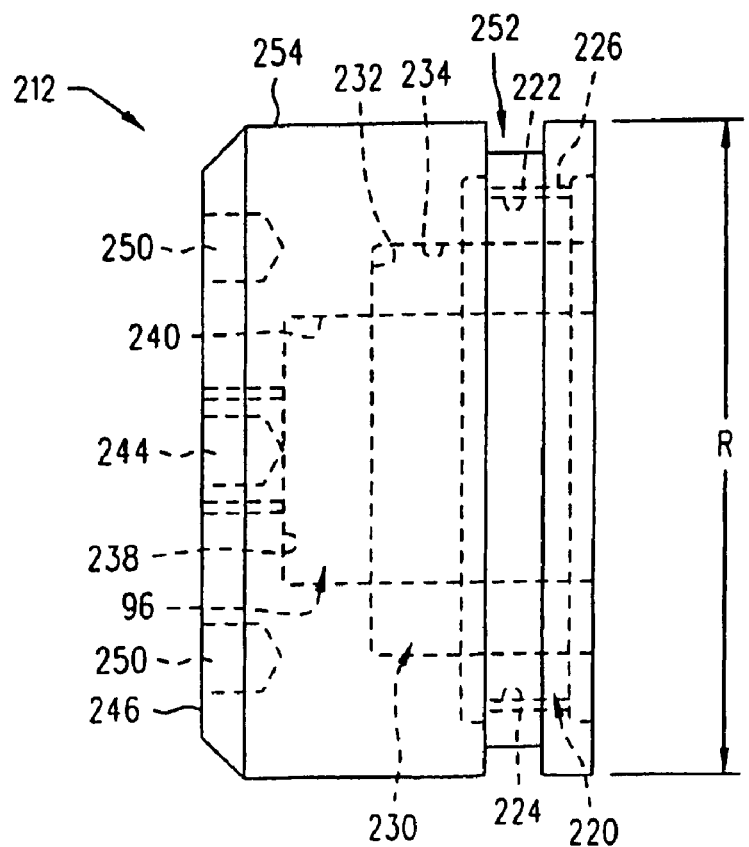
FIG. 4 is an elevational view of the cup portion of FIG. 3.

FIGS. 3 and 4 illustrate the cup portion 212 in further detail. With reference to FIGS. 3 and 4, cup portion 212 may, for example, be integrally formed from a metal material, such as steel, stainless steel, or aluminum. Cup portion 212 may include a first chamber 220 having an annular bottom wall 222 and a circumferential sidewall 224 having threads 226 formed therein. As described in greater detail below, the threads 226 are used to secure the lid portion 214, FIG. 2, to the cup portion 212. A second chamber 230 may be concentrically located with respect to the first chamber 220, extending downwardly from the bottom wall 222 thereof. The second chamber 230 may include an annular bottom wall 232 and a circumferential sidewall 234 as shown. A third chamber 236 may be concentrically located with respect to the first and second chambers 220, 230 and may extend downwardly from the bottom wall 232 of the second chamber 230. The third chamber 236 may include a bottom wall 238 and a circumferential sidewall 240 as shown. A hole, such as a threaded hole 244 may extend between the cup portion 212 bottom surface 246 to the bottom wall 238 of the third chamber 236.

Having described some of the interior components and elements of the cup portion 212, some of the exterior components and elements will now be described. A plurality of blind holes 250 may extend from the cup portion bottom surface 246 into the cup portion 212 to facilitate engagement with a wrench or other tool. Such tools may be used during manufacture or installation of the cup portion 212 or the ball unit 200 as a whole. An annular groove 252 may be formed in the outer circumferential surface 254 of the cup portion 212, as shown. The outer circumferential surface 254 may have a diameter "R" as indicated in FIG. 4. The diameter "R" may, for example, be about 2.188 inches or about 5.56 centimeters.

Figure 5:
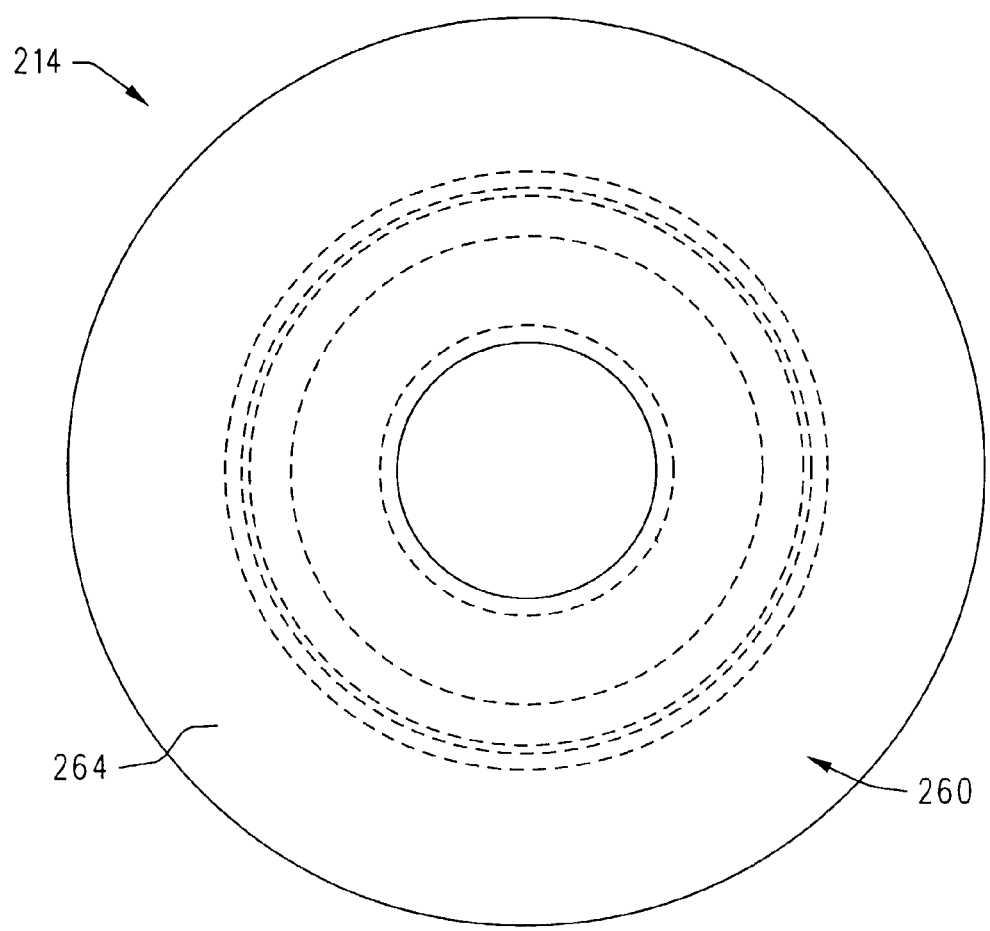
FIG. 5 is a top plan view of a cap portion of the ball unit of FIG. 2.
Figure 6:
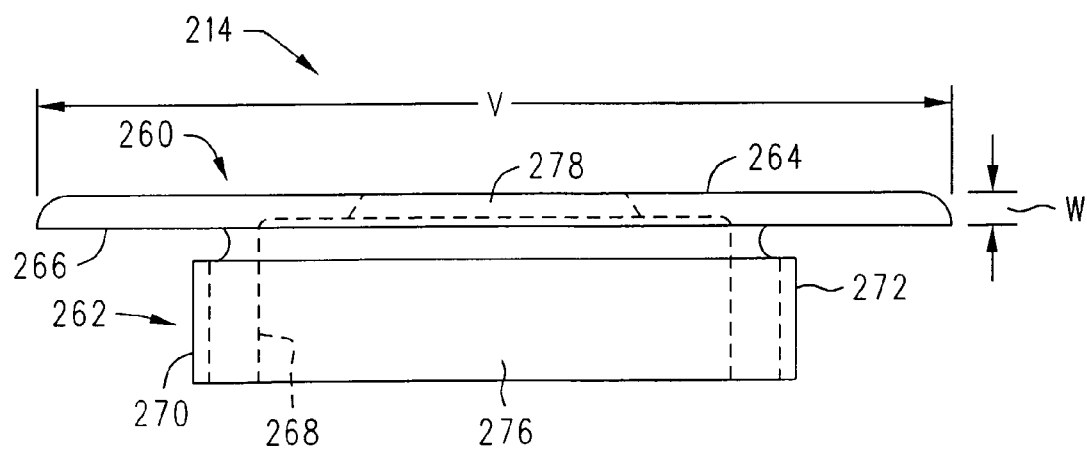
FIG. 6 is an elevational view of the cap portion of FIG. 5.

FIGS. 5 and 6 illustrate the cap portion 214 in further detail. With reference to FIGS. 5 and 6, the cap portion 214 may, for example, be integrally formed from a plastic material. The cap portion 214 may generally include a flange portion 260 and an annular wall portion 262 extending downwardly therefrom. The flange portion 260 may include an upper surface 264 and an oppositely disposed lower surface 266 and may have a diameter "V". The diameter "V" may, for example, be about 2.5 inches or about 6.35 centimeters. The flange portion 260 may have a thickness "W" extending between the upper surface 264 and lower surface 266. The thickness "W" may, for example, be about 0.094 inch or about 0.24 centimeters. Annular wall portion 262 may include a circumferential inner surface 268 and an oppositely disposed circumferential outer surface 270. Threads 272 may be formed on the outer surface 270. The threads 272 are used to screw the cap portion 214 into the cup portion 212 as described below.

As can be appreciated with reference to FIG. 6, a chamber 276 is generally bounded by the lower surface 266 of the flange portion 260 and the inner surface 268 of the annular wall portion 262. An opening 278 is provided in the flange portion 260 extending between the flange portion upper surface 264 and lower surface 266. In some embodiments, the opening 278 is a concentric tapered opening 278. As described in greater deal below, the ball may extend through the opening 278 when air pressure is applied to the ball unit 200, FIG. 2.

Figure 7:
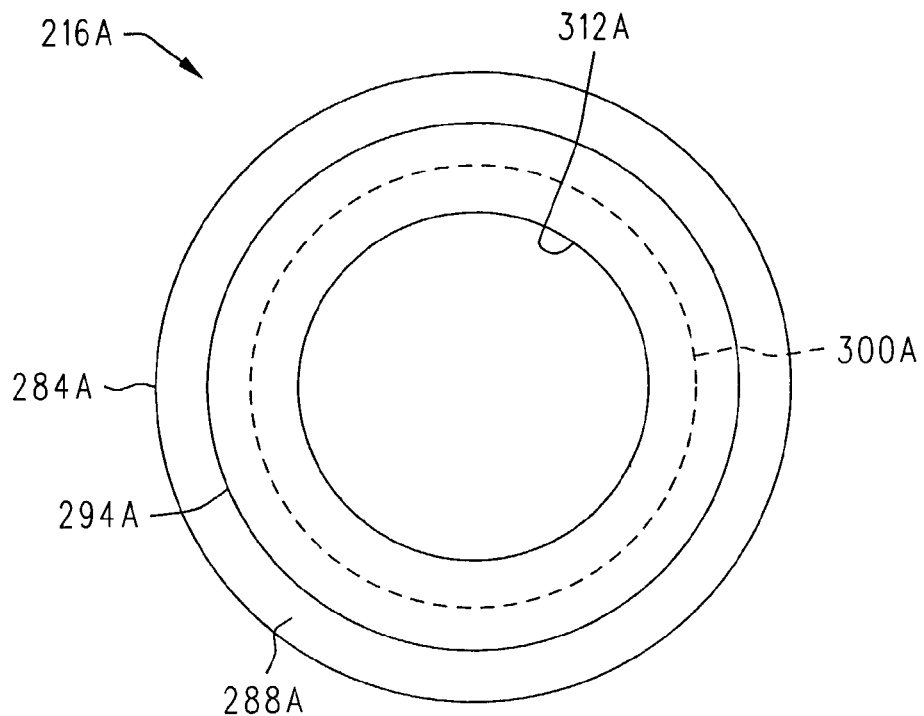
FIG. 7 is a top plan view of a bearing of the ball unit of FIG. 2.
Figure 8:
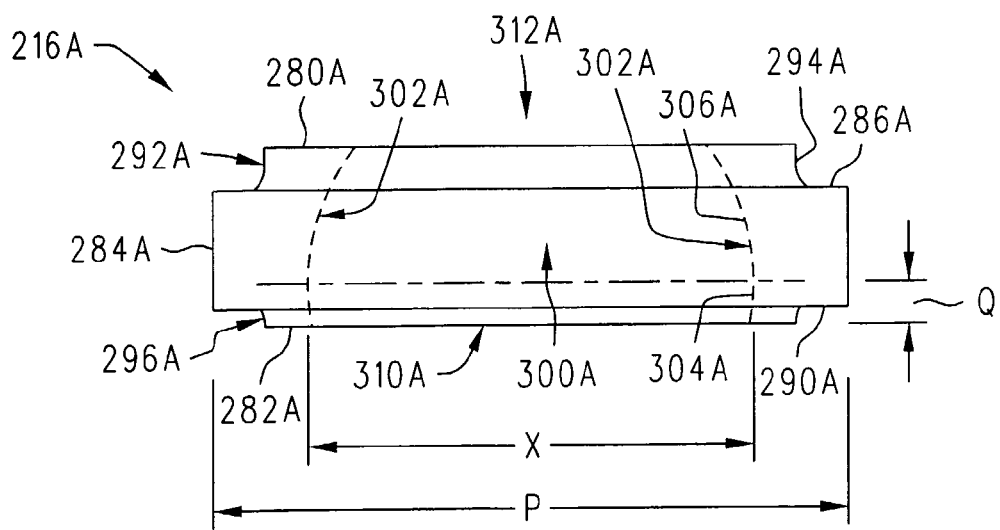
FIG. 8 is an elevational view of the bearing of FIG. 7.

The bearings 216A, 216B, FIG. 2, will now be described. FIGS. 7 and 8 illustrate the bearing 216A in further detail. It is noted that the bearings 216A, 216B may be substantially identical to one another (although installed in opposite orientations as illustrated in FIG. 2). Accordingly, only the bearing 216A will be described in detail herein, it being understood that like features on the bearings 216A and 216B will be referred to herein by like numerals followed by the appropriate letter designation "A" or "B".

The bearing 216A may be integrally formed, for example, from oil impregnated wood, such as maple. Although wood is currently preferred due, for example, to the ease with which it may be worked, an alternative material could be used so long as it possesses adequate friction properties as described herein. The bearing 216A may include a first annular end surface 280A and a second, oppositely disposed, annular end surface 282A. The bearing 216A may further include an outer circumferential surface 284A having a diameter "P" as indicated. The diameter "P" may, for example, be between about 1.362 inch and about 1.374 inch or between about 3.46 centimeters and about 3.49 centimeters. The outer circumferential surface 284A may extend between a first annular intermediate surface 286A and a second annular intermediate surface 290A, as shown. A first annular notch 292A may be defined by a first reduced diameter surface portion 294A extending generally between the first annular end surface 280A and the first annular intermediate surface 286A. A second annular notch 296A may be defined by a second reduced diameter surface portion 280A extending generally between the second annular end surface 282A and the second annular intermediate surface 290A.

A chamber 300A may be located within the bearing 216A, the chamber 300A being partially defined by a surface 302A. The surface 302A, in turn, may include both a cylindrical surface portion 304A and a spherical surface portion 306A. Cylindrical surface portion 304A may extend from the second annular end surface 282A for a distance "Q" of about 0.063 inch or about 0.16 centimeter and may have a diameter "X". The diameter "X" may be chosen to be only slightly larger than the diameter "Y" (FIG. 2) of the ball 210 in order to reduce air loss from the system, as will be discussed further herein. The diameter "X" may, for example, be about 1.006 inches or about 2.56 centimeters while the diameter "Y" may, for example, be about 1.000 inch or about 2.54 centimeters.

The cylindrical surface portion 304A defines a circular opening 310A located concentrically within the second annular end surface 282A. The spherical surface portion 306A may be formed in the shape of a portion of the surface of a sphere having a radius of about 0.503 inch or about 1.28 centimeters. Spherical surface portion 306A defines a circular opening 312A at its intersection with the first annular end surface 280A.

Having described the components of the ball unit 200, FIG. 2, the ball unit 200 as a whole will now be described. With additional reference to FIG. 2, the aforementioned components may be assembled as follows. An O-ring 320 may be placed within the third chamber 236 of the cup portion 212 so that it is seated against both the cup bottom wall 238 and circumferential side wall 240 (FIG. 4), as shown. An O-ring 322 may be placed within the second chamber 230 of the cup portion 212 so that it is seated against both the cup annular bottom wall 232 and circumferential side wall 234, which is shown in greater detail in FIG. 4. Next, the bearing 216B may be installed within the second chamber 230 such that the circular opening 312B (FIGS. 7-8) is facing upwardly, as shown. Installed in this manner, the O-ring 322 will be received within the first annular notch 292B of the bearing 216B. Thereafter, an O-ring 324 may be placed partially within the annular notch 296B of the bearing 216B.

The ball 210 may then be placed at least partially within the chamber 300B of the bearing 216B. The bearing 216A may then be installed over the ball 210 in an orientation opposite to that of the bearing 216B (i.e., the bearing 216A is installed such that the circular opening 312A (FIGS. 7-8) is facing downwardly). After installing the bearing 216A in this manner, the annular surface 282A of the bearing 216A may be in substantial contact with the surface 282B of the bearing 216B. The arrangement of the bearings 216A, 216B causes the O-ring 324 to be located within both of the notches 296A, 296B of the bearings 216A, 216B, respectively.

An O-ring 326 may be installed at least partially within the notch 292A of the bearing 216A. Alternatively, the O-ring may be placed into the chamber 276 of the cap portion 214, FIG. 6. The cap portion 214 may then be installed on the cup portion 212 by engaging the threads 272 of the cap portion 214 (FIG. 6) with the threads 226 of the cup portion 212 (FIG. 4). More specifically, the cap portion 214 may be screwed into the cup portion 212. An O-ring 328 may be fitted within the groove 252 of the cup portion 212, as illustrated in FIG. 3

With continued reference to FIG. 2, in operation, the ball 210 is able to move in the directions indicated by the arrow 330 between an upper position 332 and a lower position 336. As can be appreciated, in the upper position 332, the ball 210 is in contact with the opening 312A of the bearing 216A, and in the lower position 336, the ball 210 is in contact with the opening 312B of the bearing 216B (FIGS. 7-8) and may also be in contact with O-ring 320.

Platform of the Curved Portion

The platform 112 of the curved portion 110, FIG. 1, of the conveyor system 100 will now be described. It is noted that several different embodiments of the platform will be described including embodiments were the ball units 120 are recessed into the platform 112 and embodiments wherein the ball units 120 extend from the surface of the platform. The curved portion 110 will be described in greater detail below after descriptions of the motorized pulleys are provided.

Figure 9:
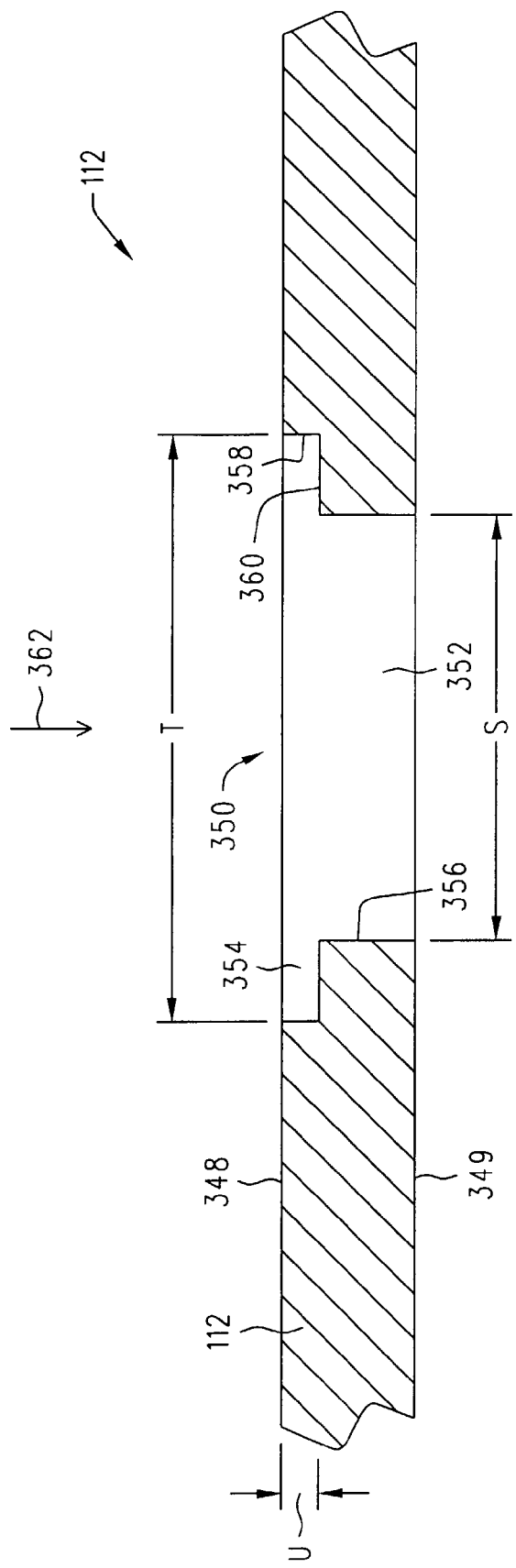
FIG. 9 is a cross sectional view of the curved portion of the conveyor system of FIG. 1 with the ball unit removed for illustrative clarity.

FIG. 9 is a cross-sectional view of a portion of the platform 112. As shown in FIG. 9, the platform has an upper surface 348 and a lower surface 349. With additional reference to FIG. 1, the platform 112 has a plurality of holes or openings that are sized to receive the ball units 120. An opening 350 is exemplary of the other openings in the platform 112. The opening 350 is shown with the corresponding ball unit removed for clarity. As can be seen from FIG. 9, the opening 350 may include a through hole 352 extending through the platform 112. The hole 352 includes a counterbored portion 354. The hole 352 may be defined by a circumferential surface 356 having a diameter "S" while the counterbored portion 354 may be defined by a circumferential surface 358 having a diameter "T" and by an annular lower surface 360. The annular lower surface 360 may be located a distance "U" from the upper surface 348 of the platform 112.

Referring additionally to the ball unit 200 of FIG. 2, the diameter "S" of the through hole 352 may be slightly larger than the diameter "R" (FIG. 2) of the cup member outer surface 254. Accordingly, when the cup portion 212 of the ball unit 200 is installed in the opening 350, the cup portion 212 will easily fit within the through hole 352 of the platform 112. The diameter "T" of the counterbored portion 354 may be slightly larger than the diameter "V" of the cap portion flange 264 (FIG. 5). The diameter "V" facilitates the insertion of the ball unit 200 into the opening 350 as described in greater detail below.

To install the ball unit 200, FIG. 2, within the opening 350, the ball unit 200 may first be positioned over the opening 350 and then moved downwardly in the direction indicated by the arrow 362 in FIG. 9, causing the ball unit cup portion 212 to move through the through hole 352 of the opening 350. This downward movement is continued until the lower surface 266 of the ball unit cap portion 214 (FIGS. 2 and 6) contacts the annular lower surface 360 of the counterbored portion 354. In this condition, the O-ring 328, FIG. 2, will be compressed between the outer surface 254 of the cup portion 212 (FIGS. 3 and 5) and the circumferential surface 356 of the through hole 352, thus retaining the ball unit 200 within the opening 350. The O-ring 328 may also be compressed between the groove 252 in the outer surface 254 and the circumferential surface 356. Alternatively, the ball unit 200 may be retained within the opening 350 in any conventional manner.

Other embodiments of the installation include screwing or otherwise attaching the ball unit to the platform 112. In some embodiments, the cap portion 214 is integrally formed into the platform. The cup portion 212 may then be screwed or otherwise attached to the cap portion 214.

The thickness "W" of the ball unit flange 260, FIG. 6, may be substantially the same as the depth "U" of the countersunk portion 354; accordingly, when installed as described above, the upper surface 264 of the ball unit flange 260 will be substantially coplanar with the upper surface 348 of the platform 112.

Figure 10:
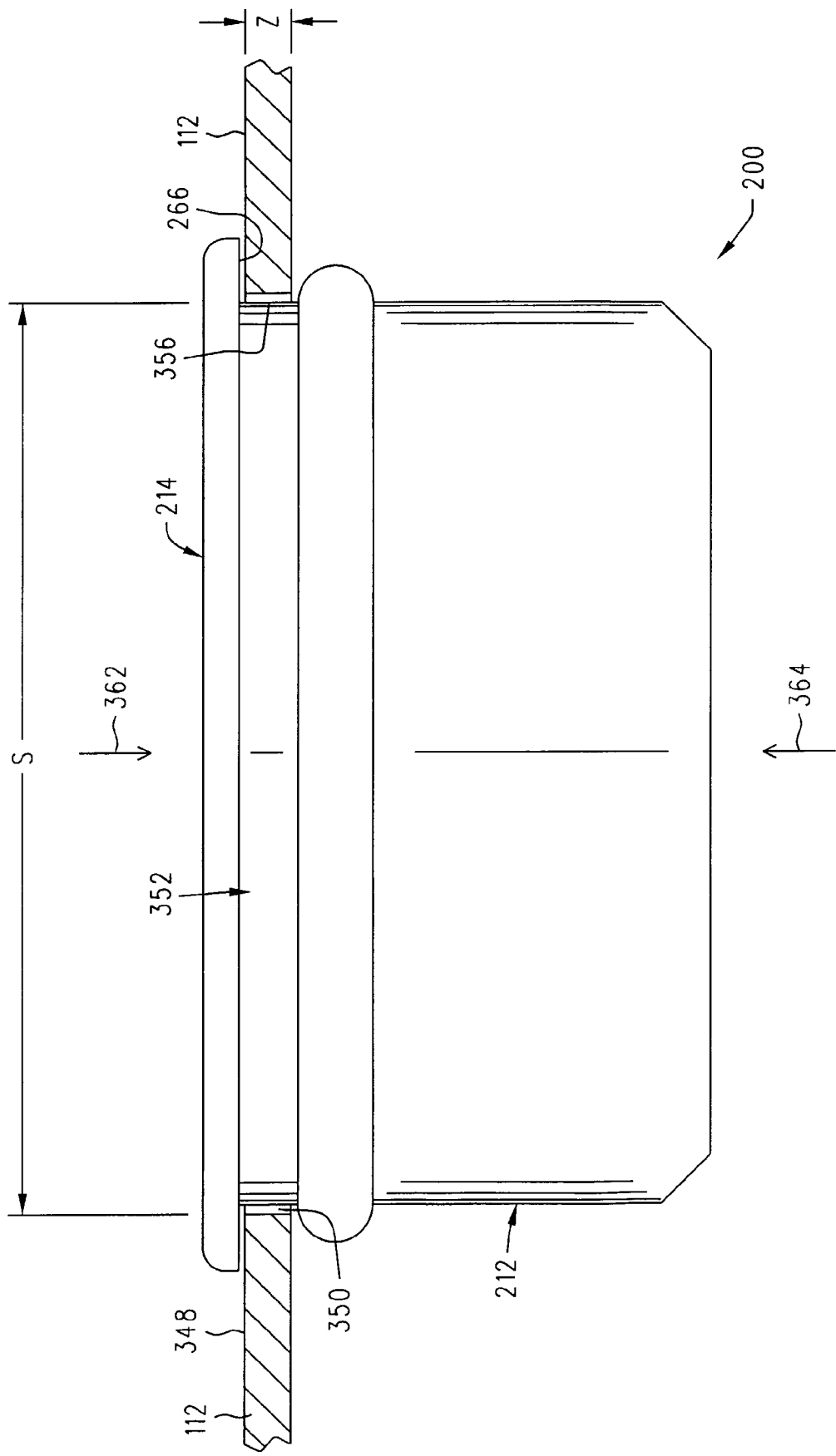
FIG. 10 is a cross sectional view of the platform of FIG. 1 with the corresponding ball unit removed for illustrative clarity.

FIG. 10 shows an alternative arrangement for mounting the ball units 200 within the platform 112. In FIG. 10, the ball unit 200 is shown mounted within the opening 350 of the platform 112. For illustrative purposes, the platform 112 is shown in cross-section while the ball unit 200 is not. The remaining openings in the platform 112 may be formed in a substantially identical manner to as will now be described.

As in FIG. 9, the through hole 352 in FIG. 10 may extend completely though the platform 112. In the FIG. 10 embodiment, however, the counterbored portion 354 shown in FIG. 9 may be omitted. With reference to FIG. 10, through hole 352 may be defined by a circumferential surface 356 having a diameter "S". The diameter "S" of the through hole 352 may be slightly larger than the diameter "R" (FIG. 3) of the cup member outer surface 254. The thickness "Z" of the platform 112 may be chosen to be the same as the distance between the O-ring 328 and the lower surface 266 of the cap portion 214. In some embodiments, the thickness "Z" may be slightly greater than the distance between the O-ring 328 and the lower surface 266 of the cap portion 214.

To install the ball unit 200 within the opening 350, the ball unit 200 may first be positioned over the opening 350 with the O-ring 328 removed. The ball unit 200 may then be moved downwardly in the direction indicated by the arrow 362 in FIG. 10, causing the ball unit cup portion 212 to move through the through hole 352 of the opening 350. This downward movement is continued until the lower surface 266 of the ball unit cap portion 214 contacts the upper surface 348 of the platform 112. In this condition, the annular groove 252, FIG. 4, will be located just below the lower surface 349 of the platform 112. The O-ring 328 may then be installed within the groove 252 by sliding it over the cup portion 212 from beneath the platform 112 in the direction 364. Once the O-ring 328 is installed in this manner, it will prevent the ball unit 200 from moving in the direction 364, thus securely locking the ball unit 200 in place. It is noted that the edge of the ball unit cap portion 214 may be slightly tapered so as to facilitate the movement of an item on the platform 112.

The operation of the ball units 120, FIG. 1, in the curved portion 110 of the conveyor system 100 will now be described. The ball units 120 will be described with reference to the ball unit 200, FIG. 2, As noted previously, the ball 210, FIG. 2, is able to move between an upper position 332 and a lower position 336. Thus, when the ball is in the upper position 332, a relatively larger portion of the ball 210 will extend above the upper surface 348 of the platform 112. When, however, the ball 210 is in the lower position 336, a relatively smaller portion of the ball will be located above the surface 348 of the platform 112. In some embodiments, the ball 210 is located below the upper surface 264 of the ball unit cap portion 214.

A supply of compressed air, indicated schematically in FIG. 2 by the reference numeral 370, may be connected to the hole 244 in the cup portion 212 in a conventional manner. The connection between the air supply 370 and hole 244 is illustrated schematically in FIG. 2 by the reference numeral 372. As can be appreciated, when no compressed air is supplied, the ball 210 will, due to gravity, be located in the lower position 336. When, however, compressed air of sufficient pressure is supplied, the ball 210 will be forced to the upper position 332. In this upper position, the ball 210 will effectively seal against the opening 312A, FIGS. 7-8, of the bearing 216A and prevent substantial loss of compressed air from the system.

It has been found that when the ball 210 is in the upper position 332, as discussed above, the ball 210 is capable of effectively supporting a moving load, e.g., a tote moving across the curved portion 110, FIG. 1, of the conveyor system 100. As can be appreciated, when supporting a load in this manner, upward force on the ball 210 is provided solely by air pressure, thus obviating the need for mechanical contact with springs, roller bearings, etc. that otherwise would tend to create increased friction and, thus, heat and wear. Accordingly, the ball unit 220 is capable of conveying items in a high speed manner without appreciable wear or heat generation.

The air pressure supplied to each of the ball units 120, FIG. 1, on the platform 112 may be chosen and adjusted depending upon such factors as the weight of the individual items being conveyed. Other criteria for the air pressure supplied to the ball units 120 is the spacing of the ball units 120 within platform 112 such that adequate upward force is supplied to support the items above the surface 348 of the platform 112. It has been found, however, that even if the ball 210 is forced to its lower position 336, the supplied air pressure will still serve to reduce frictional contact between the ball 210 and the lower bearing 216B and, thus, continue to reduce frictional resistance to the moving load being conveyed.

It is noted that if the ball 210 assumes an intermediate position between the upper position 332 and the lower position 336, no seal will be established within the ball unit 200 because the ball 210 is in contact with neither the upper bearing opening 312A nor the lower bearing opening 312B. Accordingly, in this condition, some compressed air will escape from the ball transfer unit 200. It has been found, however, that the amount of air escaping is relatively negligible so long as a small tolerance is maintained between the diameter "X" (FIG. 8) of the bearing opening 300A and the diameter "Y" (FIG. 2) of the ball 210 in a manner as previously described. It has further been found, that the relatively small amount of air that does tend to escape in this condition helps to cool the ball transfer unit 200 in a beneficial manner. Oil may be added to the compressed air so that the escaping air lubricates the ball units 120.

With reference again to FIG. 2, the O-ring 320 serves to reduce the quantity of compressed air required to initially move the ball from the lower position 336 to the upper position 332. This is achieved by reducing the amount of air that contacts the ball 210 when the ball 210 is in the lower position 336.

It is noted that, although the ball units 120 have been described herein used in conjunction with a curve or turn in a conveyor system, it could also readily be used as a linear conveyor if desired. Such embodiments are described in greater detail below with regard to the accelerator 130.

Although the use of compressed air has been disclosed herein, it is noted that other types of gas (e.g., nitrogen) could alternatively be used. Further, other types of fluid (e.g., a liquid such as water) could also alternatively be used. As described above, the gas could have oil, which lubricates the ball transfer devices 120.

Figure 11:
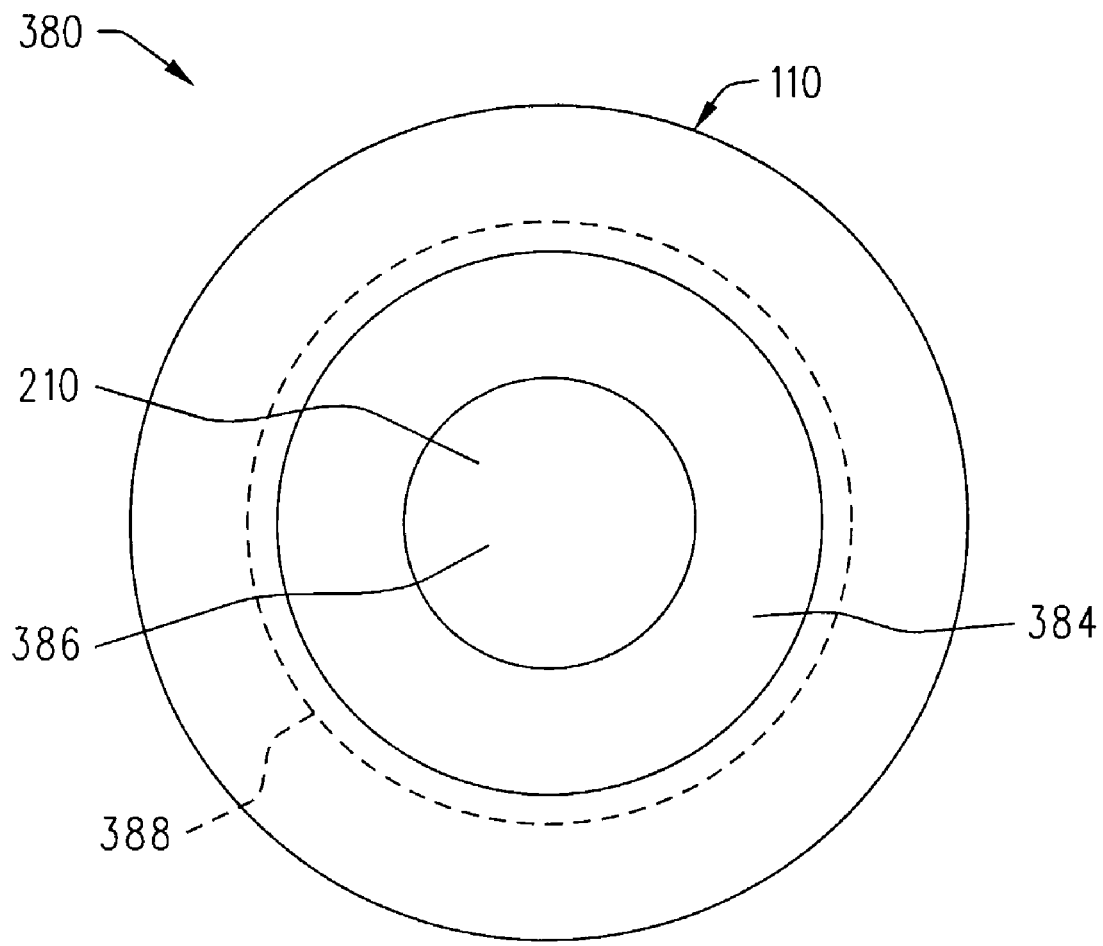
FIG. 11 is a top plan view of an embodiment of a ball unit which is similar to the ball unit of FIG. 2.

Having described some embodiments of the ball units 120, other embodiments of the ball units 120 will now be described. A top plan view of an embodiment of a ball unit 380 is shown in FIG. 11. The ball unit 380 is substantially similar to the ball unit 200 of FIG. 2 and the related figures except the ball unit 380 has a washer 384 added thereto which keeps debris from entering the ball unit 380.

The washer 384 may be made of a flexible material, such as material commonly used to fabricate belts of belt-type conveyors. The washer 384 may have a hole 386 formed therein wherein a portion of the ball 210 may extend through the hole 386. The washer 384 may also have an outer circumference 388, which may be located below the ball unit cap portion 214. In such a configuration, the washer 384 is sandwiched or otherwise secured in position between the ball unit cap portion 214 and other components of the ball unit 380. As described in greater detail below, the washer 384 may maintain contact with the ball 210 at all times, even when the ball 210 is recessed within the ball unit 380. Accordingly, washer 384 prevents debris from entering the ball unit 380.

Figure 12:
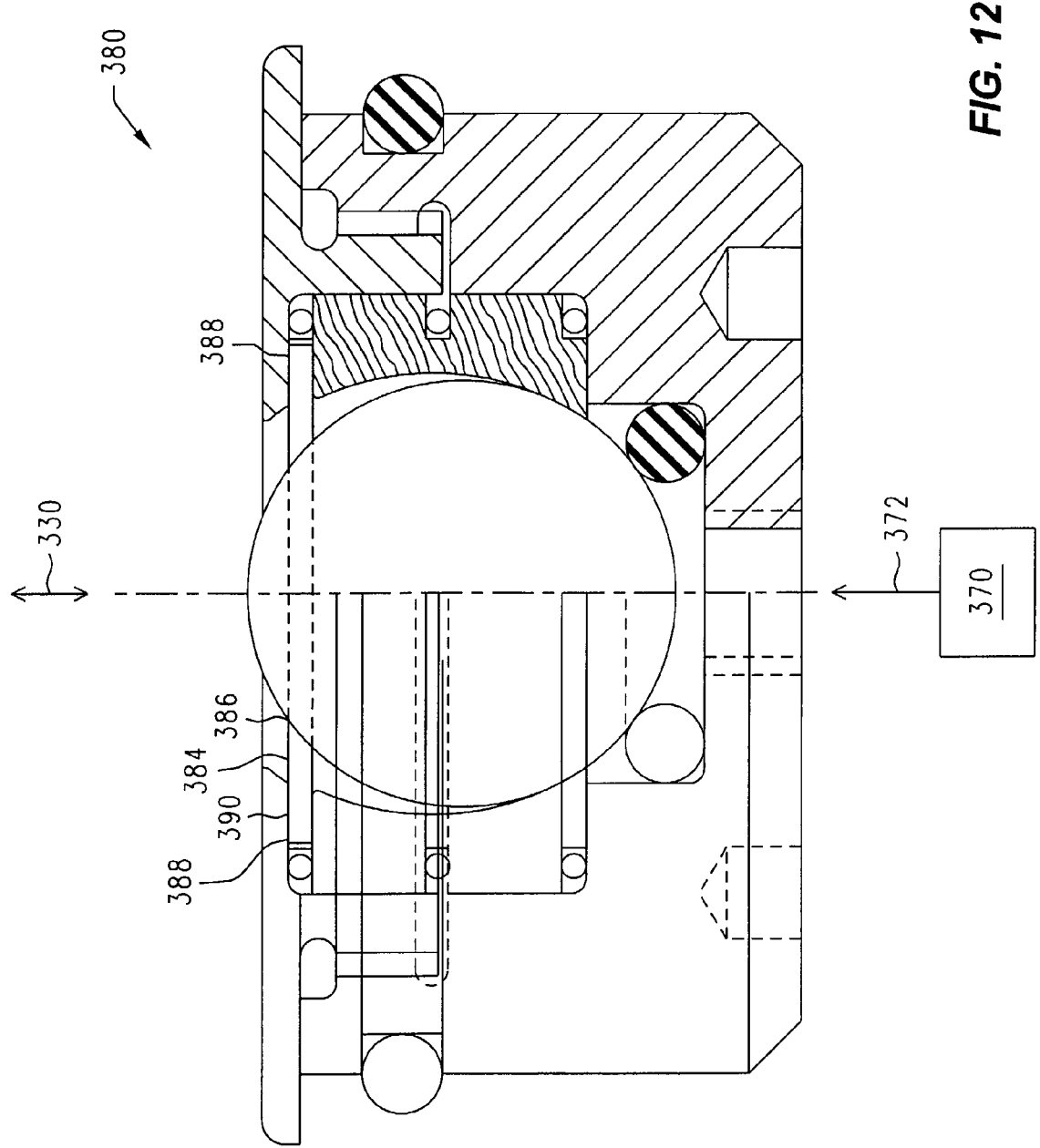
FIG. 12 is an elevational partial cross-sectional view of the ball unit of FIG. 11.

An elevational partial cross-sectional view of the ball unit 380 of FIG. 11 is shown in FIG. 12. It is noted that FIG. 12 is substantially similar to FIG. 2 with the ball 210 in the lower position 336 and the washer 384 included therein. In the embodiment of FIG. 12, the washer 384 is sandwiched between the ball unit cap portion 214 and the bearing 216A. As shown in FIG. 12, the washer 384 contacts the ball 210 when the ball 210 is recessed or in the lower position 336. This contact prevents debris from entering the ball unit 380 and interfering with the contact between the ball 210 and the bearings 216A, 216B.

It is noted that the ball unit 380 of FIG. 12 may have to be modified relative to the ball unit 200 of FIG. 2 in order to accommodate the washer 384. For example, the opening 278 in the ball unit cap portion 214 may have to be larger in order to accommodate the washer 384. The ball unit cap portion 214 may also have a recessed portion 390 that is sized to receive the washer 384. The recessed portion 390 may serve to hold the washer 384 securely without damaging the washer 384.

As described above, the washer 384 serves to keep debris from entering the ball unit 380. When the ball 210 is recessed in the ball unit 380, the washer 384 contacts the ball 210, which prevents debris from entering the ball unit 380. When the ball 210 rises, the washer 384 flexes enough to remain in contact with the ball 210, but has minimal adverse affect on the rotation of the ball 210. Thus, the washer 384 keeps debris out of the ball unit 380 and does not interfere with the function of the ball 210.

Other embodiments of the ball units include changing the size of the balls. For example, some heavier loads may be better transported using larger balls and lighter loads may be better transported using smaller balls. The bearings and other components within the ball units may be changed to accommodate the different sized balls.

Pulleys

Referring again to FIG. 1, the wall 114 may have a plurality of pulleys 124 located thereon wherein some or all of the pulleys 124 may be motorized. In some embodiments, the pulleys are motorized, air-cooled pulleys. It is noted that the pulleys 124 are mounted vertically, which would cause conventional oil-filled pulleys to leak oil from the lower ends.

Various motorized, air-cooled pulleys are disclosed herein. The pulleys serve to provide a rotating surface, which can be used for a variety of purposes. The rotating surfaces may be, as an example, used in a factory or warehouse to move goods or articles, such as the above-described items. A motor within the pulley enables an outer surface of the pulley to spin. However, the motor generates heat, which must be removed in order for the pulley to operate properly. Conventional motorized pulleys used oil to transfer the heat from the motor. These oil filled pulleys tend to be heavy and they require maintenance. For example, seals in the pulleys need to be maintained in order to prevent the oil from leaking from the pulleys. The conventional pulleys also do not operate well when they are operated vertically. The pulleys disclosed herein are able to operate vertically as described below. The pulleys disclosed herein also require less maintenance than conventional motorized pulleys.

Figure 13:
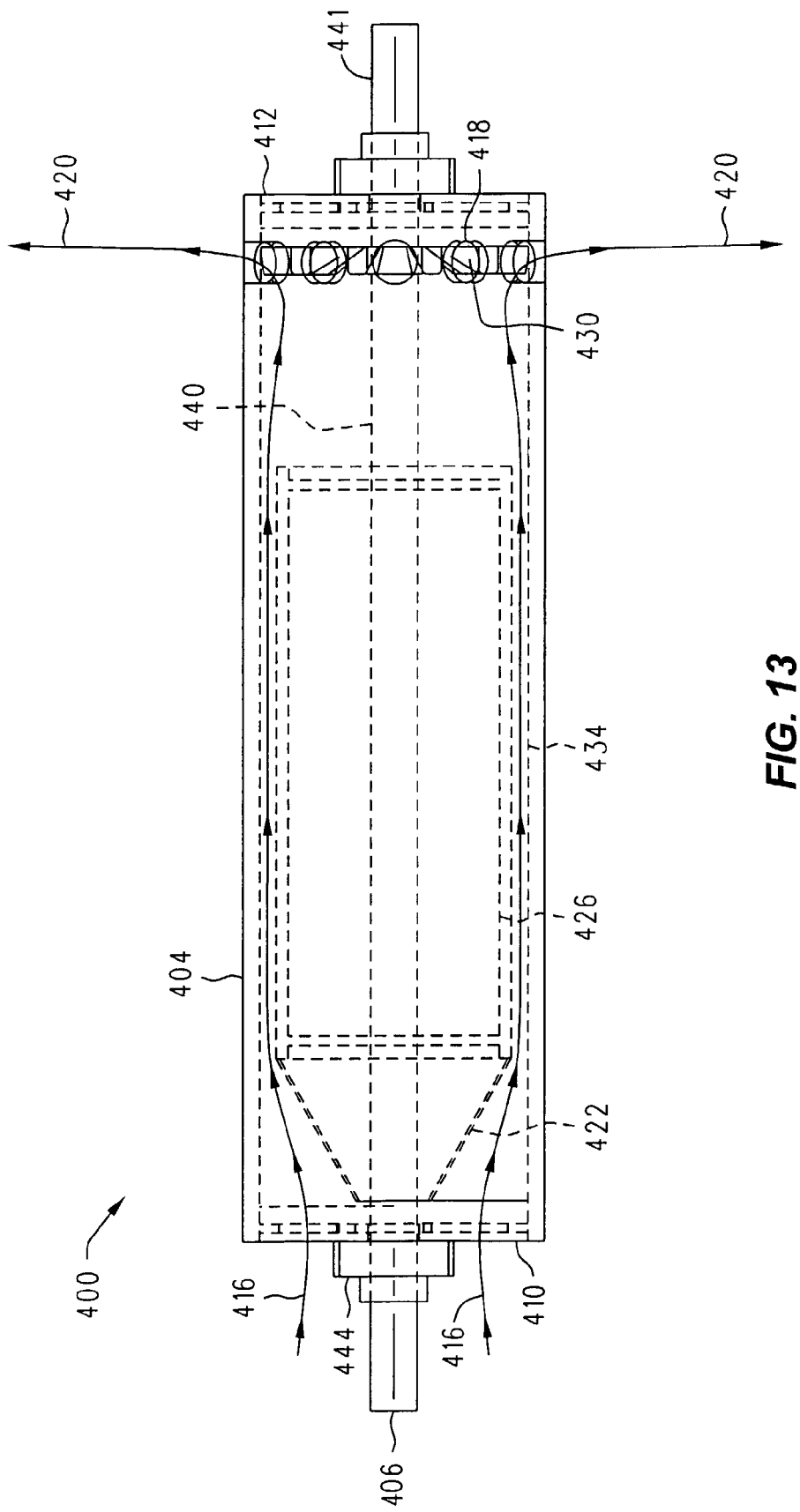
FIG. 13 is a side cut away view of an embodiment of a motorized, air-cooled pulley.

An example of an embodiment of a motorized, air-cooled pulley 400 is shown in FIG. 13, which is a side cut away view of the pulley 400. The pulley 400 includes a housing or tube 404 that rotates or spins relative to a stator shaft 406. In practice, the stator shaft 406 is affixed to a object, such as a frame, and the tube 404 rotates relative to the stator shaft 406. With reference to FIG. 1, the stator shaft 406 may be fixed to a the wall 114 or solid component associated therewith. As described in greater detail below, a rotor shaft may spin relative to the stator shaft 406. The rotor shaft is connected to the tube 404, thus, the tube 404 spins with the rotor shaft.

The ends of the tube 404 are covered or capped by a first end cap 410 and a second end cap 412. Several embodiments of end caps will be described herein. The end caps 410, 412 are connected to the tube 404. As described in greater detail below, the stator shaft 406 may extend through the first end cap 410. The first end cap 410 has air holes 416 located therein. As described below, the air holes 416 enable air to flow into the tube 404. Other air holes 418 provide for the air to be exhausted from the tube 404. The air flow is shown as reference numeral 420. It is noted that other configurations of the air flow may be implemented and some other embodiments are described below. As also described in greater detail below, bearings and other devices may be located in the end caps 410, 412 in order to enable the tube 404 to spin relative to the stator shaft 406 and other mounting devices.

Internal to the tube 404 are an air deflector 422, a motor 426, and a fan 430. The motor 426 serves to rotate a rotor relative to the stator shaft 406, which causes the tube 404 to spin relative to the stator shaft 406. The motor 426 shown in FIG. 1 represents a housing portion of the motor 426. This housing portion remains stationary relative to the spinning tube 404. The air deflector 422 deflects air to a space 434 between the motor 426 and the inside of the tube 404. Some embodiments of the pulley 400 do not include the deflector 422. In some embodiments the air passes through the motor 426. The fan 430 serves to cause air to flow through the tube 404.

Figure 14:
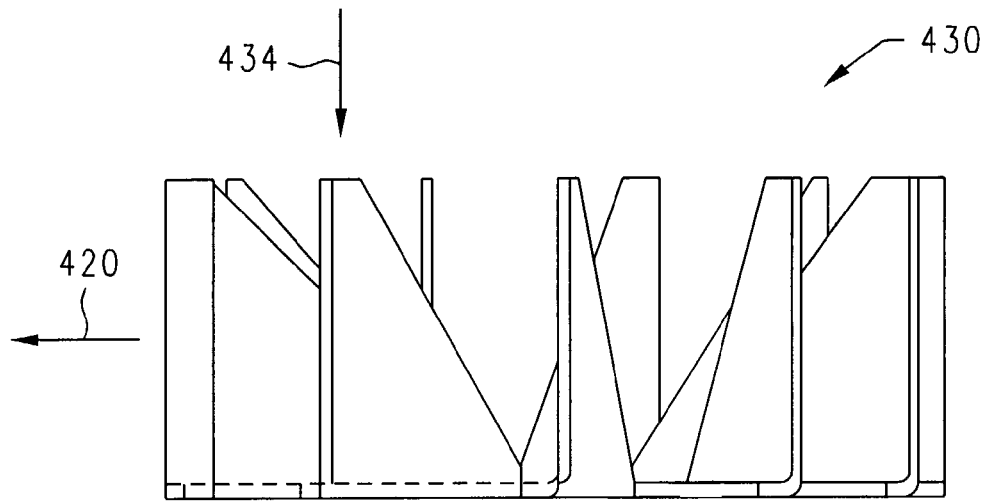
FIG. 14 is an embodiment of the fan located within the pulley of FIG. 13.

An embodiment of the fan 430 is shown in FIG. 14. The fan 430 of FIG. 14 is a side view, wherein the airflow 420 exits from the side of the fan 430. Airflow 434 may enter the portion of the fan 430 depicted as being the top of FIG. 14. The rotor of the motor 426, FIG. 13, connects to the center portion (not shown) of the fan 430 to cause it to spin. It is noted that other fan configurations may be used in the pulley 400.

Figure 15:
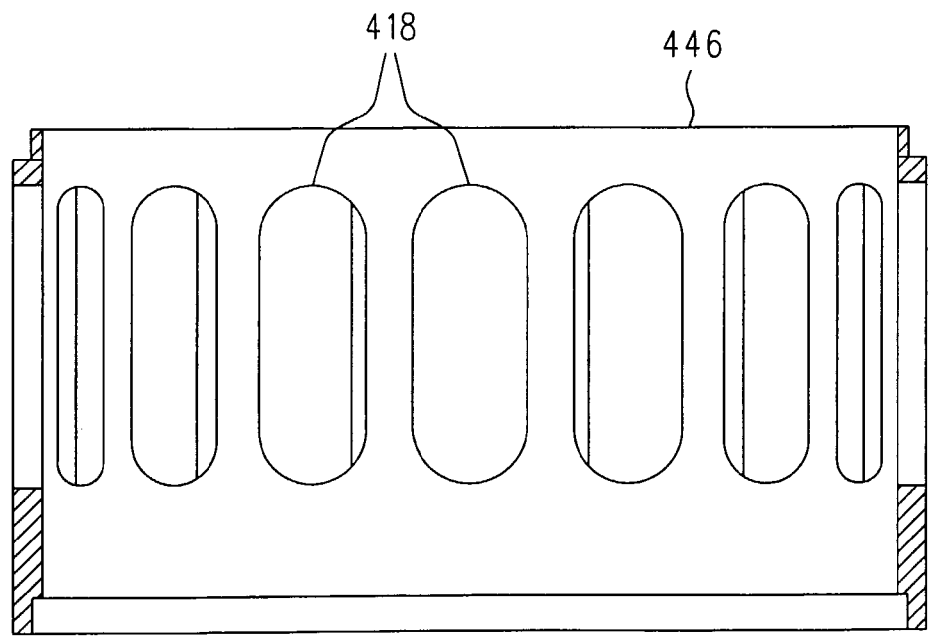
FIG. 15 is an embodiment of an extension piece that may be coupled to the tube of the pulley of FIG. 13.

An embodiment of the holes 418, FIG. 13 is shown in FIG. 15. As shown in FIG. 15, the holes 418 may be oval. In addition, the holes 418 may be incorporated into an extension 446 that extends from the tube 404, FIG. 1. For example, the extension 446 may be fabricated separate from the tube 404. The extension may be attached to the tube 404 and the second end cap 412, FIG. 13, may be attached to the extension 446. In other embodiments, the holes 418, including the oval holes of FIG. 15, are fabricated directly into the tube 404.

Referring again to FIG. 1, as briefly described above, the stator 406 remains stationary during the operation of the motor 426 and may be connected to the motor 426 so as to keep the housing stationary during operation. The motor 426 may cause a rotor 440 to spin. The rotor 440 may be located along the same axis as the stator 106. The rotor 440 is connected to the fan 430 and the tube 404 and is spun by the motor 426 as described above. Accordingly, the fan 430 spins with the operation of the motor 426 and serves to cool the motor 426.

The second end cap 412 may have a shaft 441 extending therefrom. The shaft 441 may be movable relative to the tube 404 (and the second end cap 412) and may be used to secure the pulley 400 during operation. With brief reference to FIG. 1, the shaft 441 may secure the pulleys 124 to the wall 114. Bearings or the like may be used to interface between the shaft 441 and the wall 114.

Having described the components of the pulley 400, the operation of the pulley 400 will now be described.

In the embodiment of the pulley 400 of FIG. 13, the stator 406 extends through the first end cap 410 and connects to the motor 426 or, more specifically, to the housing as shown in FIG. 13. Accordingly, the portion of the motor 426 shown in FIG. 13 remains stationary relative to the spinning tube 404 during operation. A bearing 444 or the like is located between the first end cap 410 and the stator 406, which enables the first end cap 410 to spin relative to the stator 406 without generating excessive friction.

When the motor 426 operates, the rotor 440 spins. Because the fan 430 is attached to the rotor 440, the fan 430 spins with the rotor 440. The rotor 440 is connected to the second end cap 412, which is also connected to the tube 404. Thus, when the rotor 440 spins, the fan 430 and the tube 404 also spin. The spinning fan 430 causes air to flow per the airflow path 416. Efficiency in the airflow is achieved, in one embodiment, by exhausting the air out the side of the tube 404 rather than the second end cap 412. Thus, the motor 426 is cooled by air. In other embodiments, the air may be exhausted out the second end cap 412. It is noted that the first end cap 410 may also spin with the tube 404.

Having described some embodiment of a motorized, air-cooled pulley, other embodiments will now be described.

Figure 16:
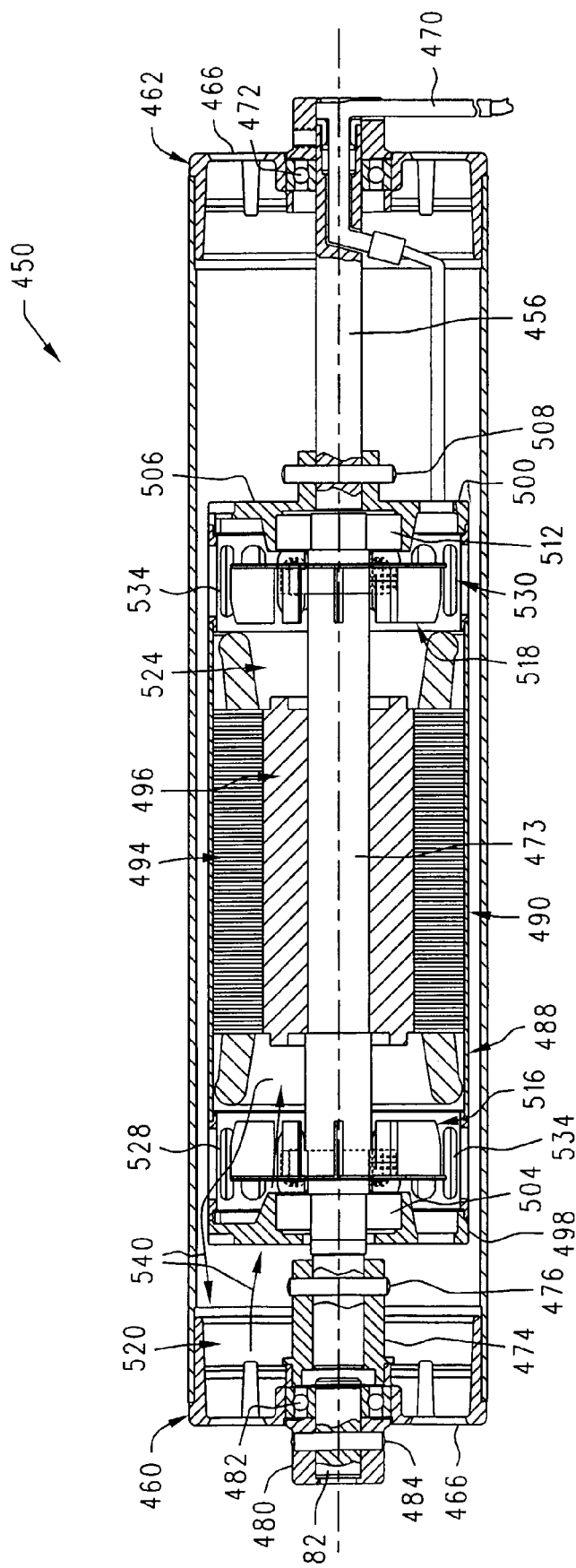
FIG. 16 is a cut away view of another embodiment of a motorized air-cooled pulley.

A cut away view of the second embodiment of a motorized, air-cooled pulley 450 is shown in FIG. 16. The pulley 450 includes a pulley shell or tube 454, which spins relative to a pulley shaft 456. The pulley 450 includes a first end cap or first end housing 460 and a second end cap or second end housing 462. Both the first and second end housings 460, 462 are attached to the tube 454. The first end housing 460 may have air holes 466 extending therethrough. Likewise, the second end housing 462 may have air holes 466 extending therethrough.

Figure 17:
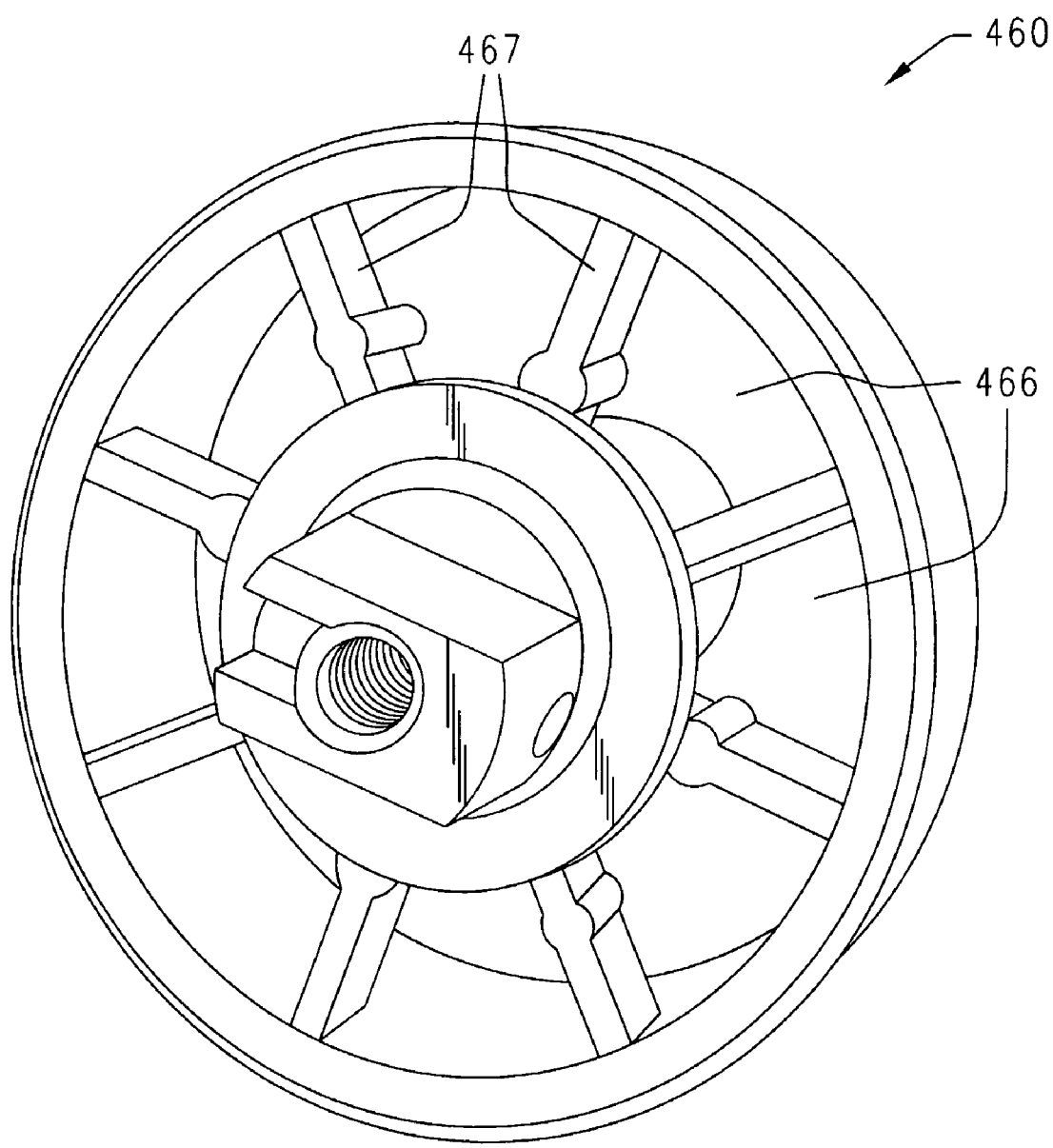
FIG. 17 is an embodiment of a portion of an end housing of the pulley of FIG. 16.
Figure 18:
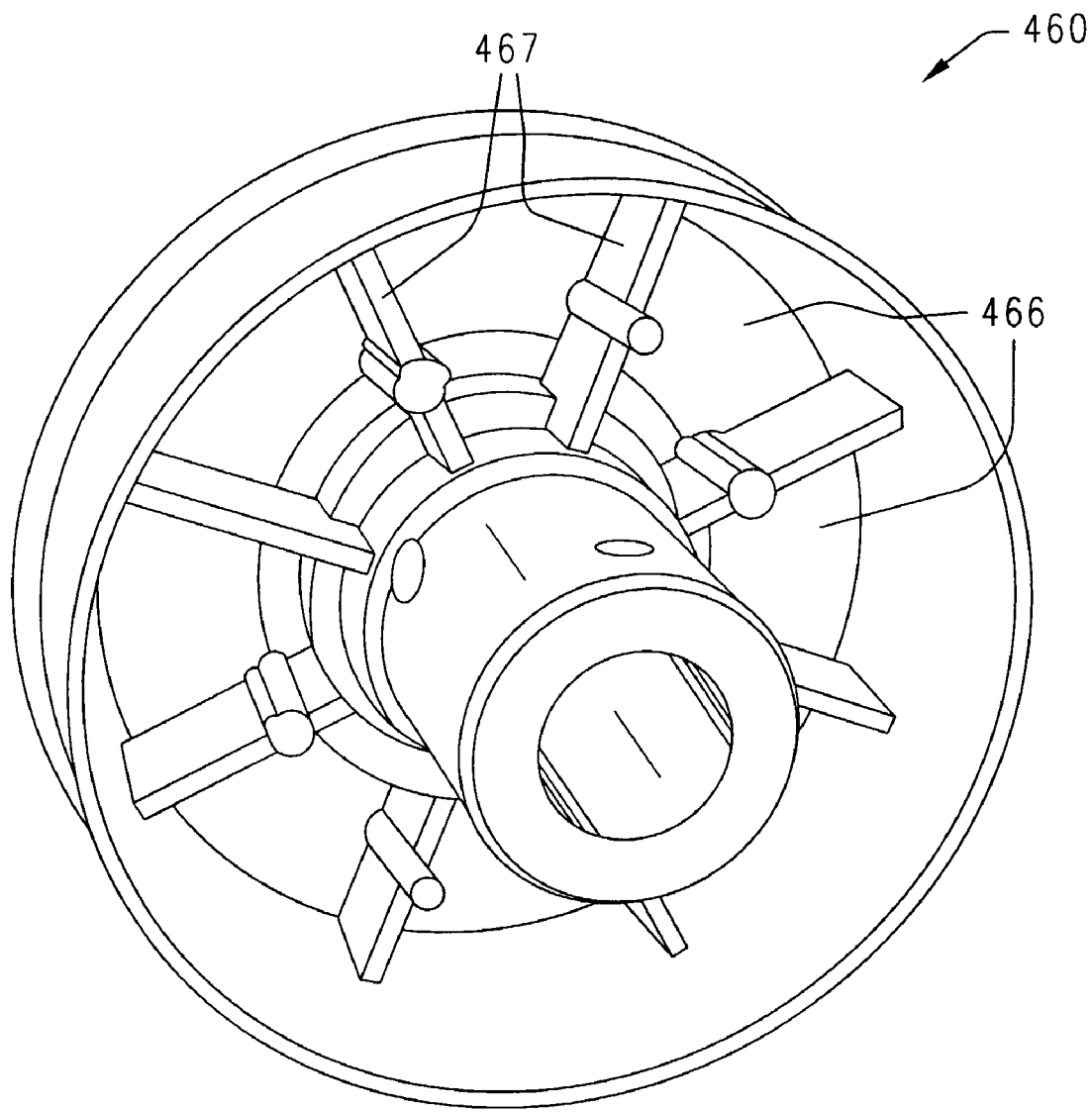
FIG. 18 is an embodiment of a portion of an end housing of the pulley of FIG. 16.

An embodiment of a portion of an end housing is shown in FIG. 17. The portion of the end housing of FIG. 17 may be used on both the first end housing 460 and the second end housing 462. The view of FIG. 17 is from the outside looking inward. The air holes 466 are separated by dividers 467 that serve to circulate or mix air. Thus, the holes 466 may provide for intake and exhaust of cooling air. The dividers 467 also serve as structural members for the end housing 460. As set forth above, FIG. 18 is a view of the portion of the end housing of FIG. 17 looking from inside the tube out. The end housing 460 may also have bearings and the like that serve to support shafts and devices that secure the conveyor 450, FIG. 16, to the wall 114.

The tube 454, FIG. 16, may have indentations (not shown in FIG. 16) formed therein. In one embodiment, the indentations extend approximately between the first and second end housings 460, 462. In one embodiment, the indentations are approximately ⅜ inches wide and approximately 0.001 inches deep and spaced approximately ⅜ inches apart. The indentations serve to increase the coefficient of friction on the exterior of the tube 454, which serves to enhance the ability of the tube to move items. The indentations also cause air turbulence on the surface of the tube, which enhances the transfer of heat from the surface of the tube, which improves the cooling capability of the pulley 450.

Figure 19:
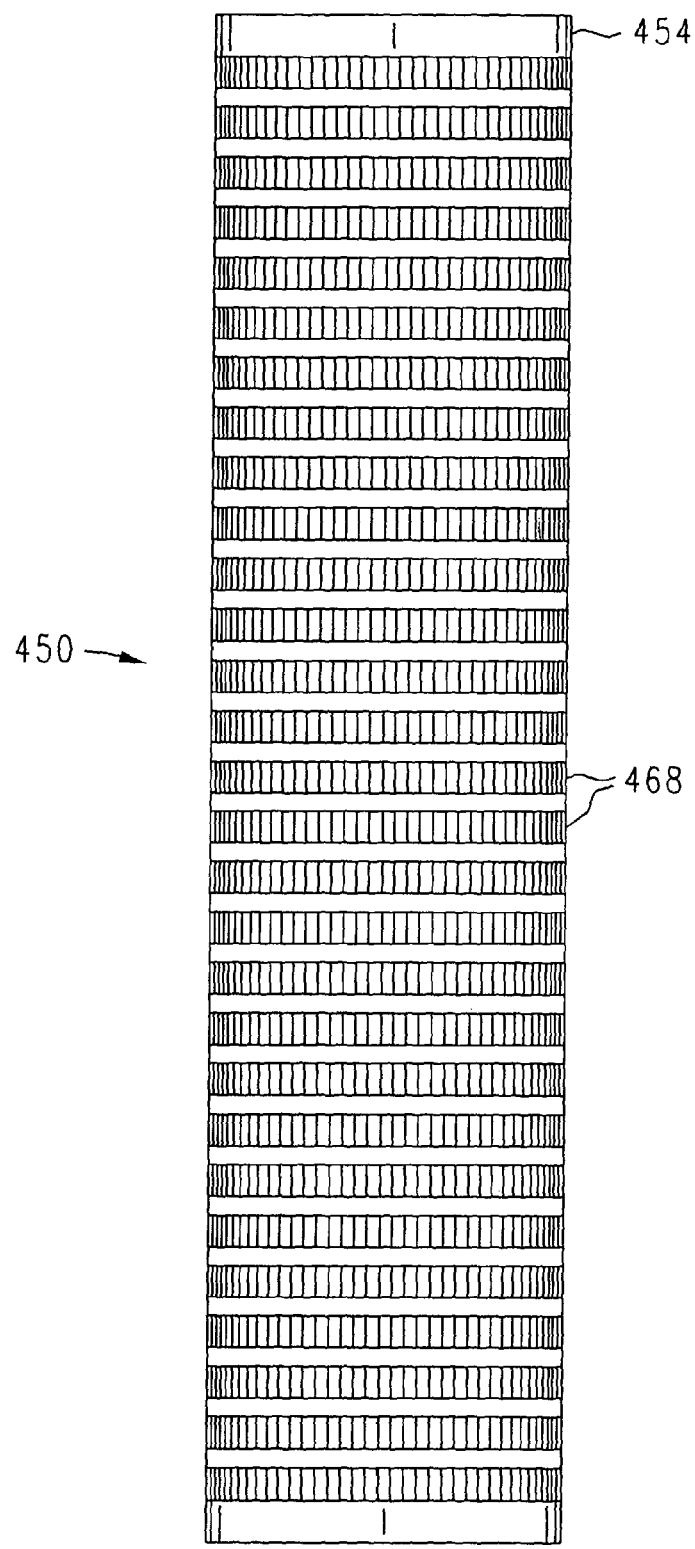
FIG. 19 is an embodiment of a tube of a motorized pulley having a plurality of indentations located thereon.

Another embodiment of indentations are shown in FIG. 19, which is an embodiment of the exterior of the tube 454. The indentations 468 extend in rows around the tube 454. The indentations may be significantly similar to the indentations described above and may be formed by knurling or otherwise cutting into the surface of the tube 454.

Figure 20:
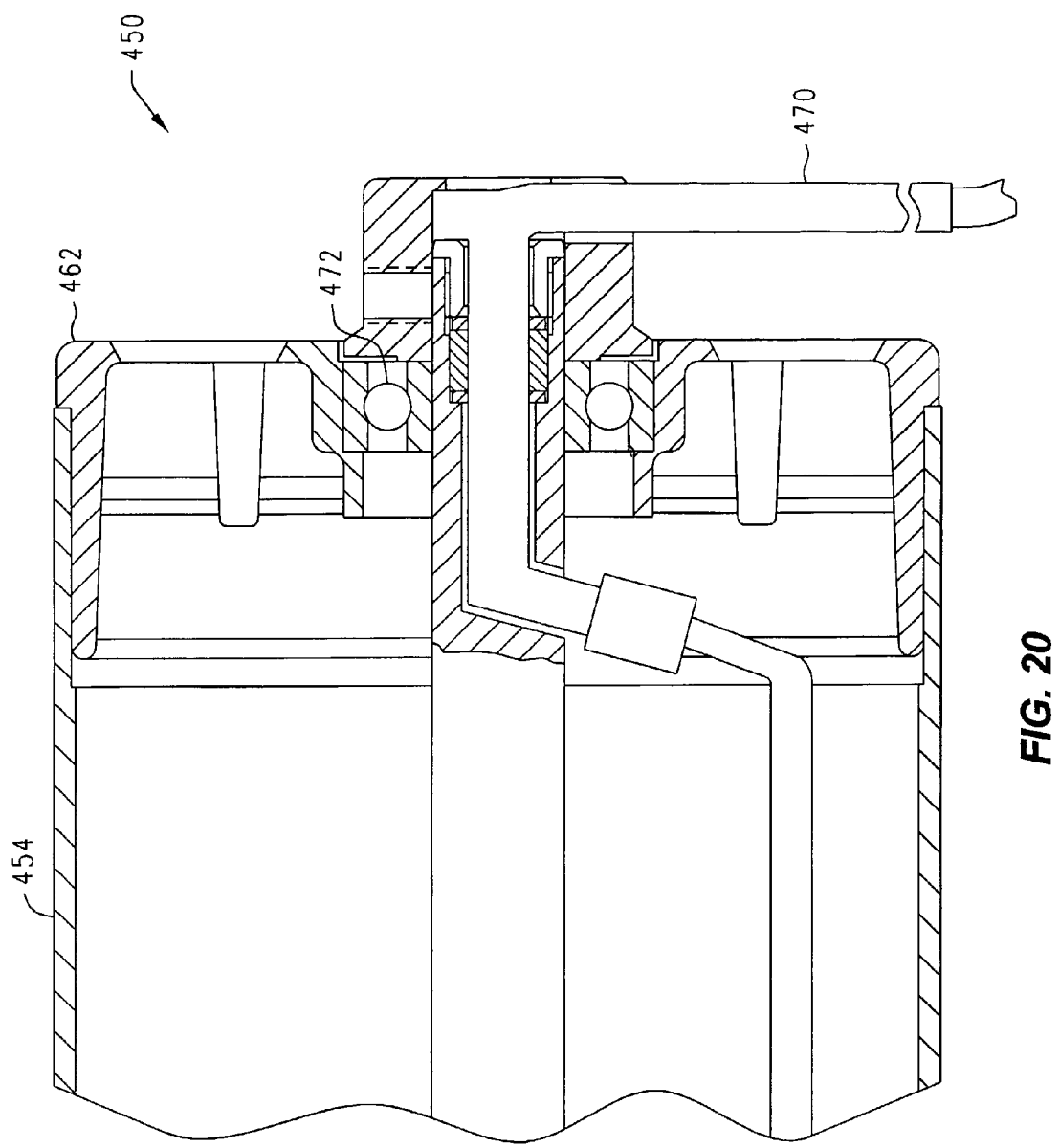
FIG. 20 is an exploded view of the portion of the pulley of FIG. 16 proximate the second end housing.

Having described some of the external components of the pulley 450, FIG. 16, the internal components will now be described. An enlarged view of the portion of the pulley 450 proximate the second end housing 462 is shown in FIG. 20. The pulley shaft 456 may extend through the second end housing 462. An electrical cable 470 may extend though the pulley shaft 456 to supply electric power to a motor as described below. The electric power may be supplied via an AC inverter, which provides a range of control over the operation of a motor located within the pulley 450. A bearing 472 or the like may be located between the second end housing 462 and the pulley shaft 456. The bearing 472 enables the second end housing 462 to spin relative to the pulley shaft 456 without creating excessive friction. In one embodiment, the bearing 472 is a ball bearing. However, other bearing configurations may be used in place of the ball bearing. Thus, as described above, the second end housing 462 and the tube 454 may spin relative to the stationary pulley shaft 456.

Figure 21:
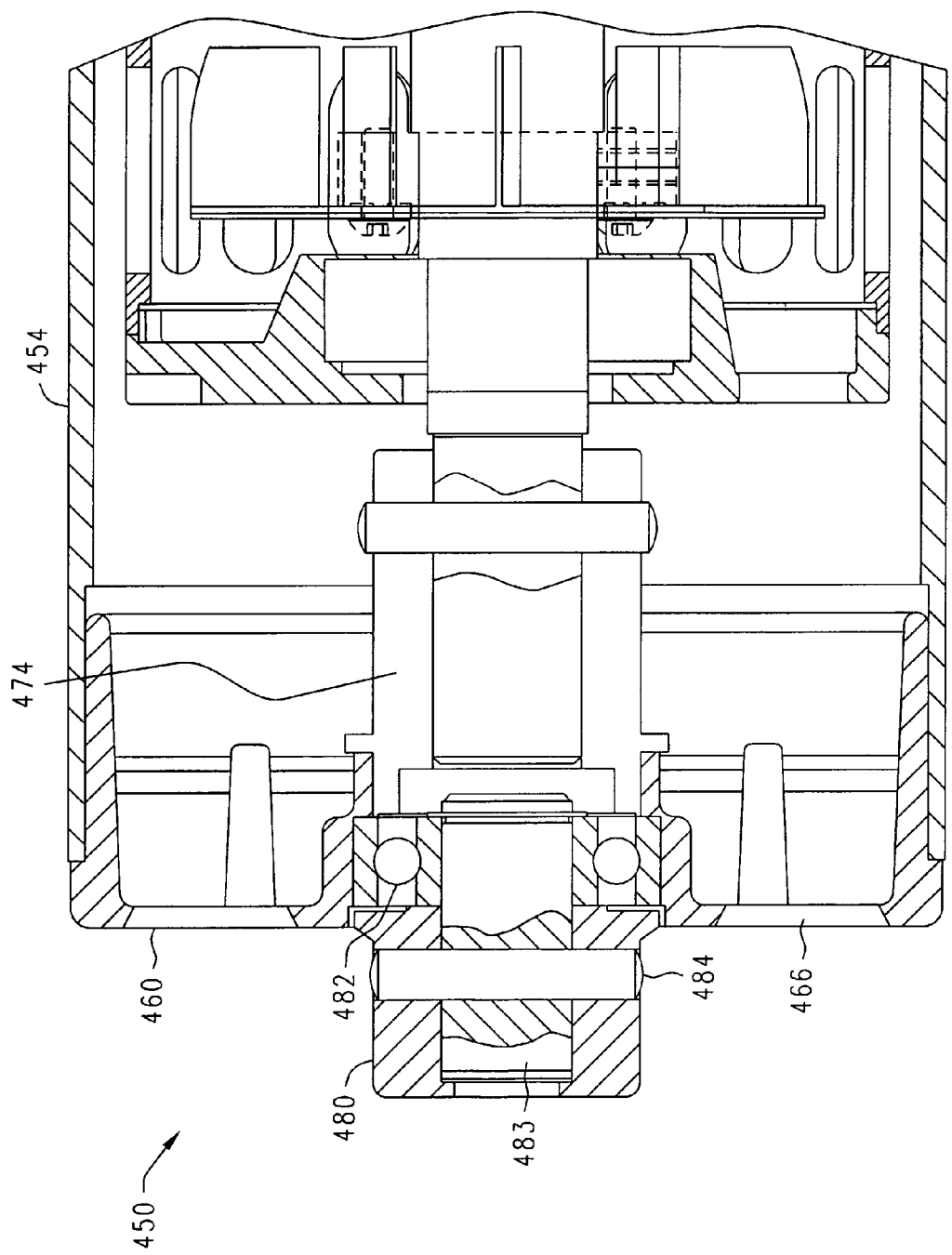
FIG. 21 is an exploded view of the portion of the pulley of FIG. 16 proximate the first end housing.

An enlarged view of the portion of the pulley 450 proximate the first end housing 460 is shown in FIG. 21. The first end housing 460 is connected to a motor shaft 473. As described below, the motor shaft 473 spins relative to the pulley shaft in order to spin the tube 454. The first end housing 460 may include a shaft adapter 474 that is adapted to receive and end portion of the motor shaft 473. The shaft adapter 474 is integral to, or otherwise connected to, the first end housing 460. In one embodiment, a pin 476 extends through the shaft adapter 474 and the motor shaft 473 in order to connect the components.

The first end housing 460 may also include a shaft cap 480 that remains stationary relative to the first end housing 460. The shaft cap 480 may interface with the first end housing 460 via a bearing 482. The bearing 482, as an example, may be a ball bearing or other conventional bearing. Thus, the shaft cap 480 portion of the first end housing 460 may remain stationary or be held stationary while the remaining portion of the first end housing 460 spins. As described in greater detail below, the shaft cap 480 may be used to secure the pulley 450 to the wall 114, FIG. 1. The shaft cap 480 may include a shaft 483 that is affixed to the shaft cap 480 by way of a pin 484. Accordingly, the shaft 483 may be used to secure the pulley 450 to the wall 114, FIG. 1.

Referring again to FIG. 16, a motor 488 is located within the tube 454. As described below, the motor 488 causes the tube 454 to spin relative to the pulley shaft 456. The motor 488 includes the motor shaft 473, a housing 490, a stator 494, and a rotor 496. The housing 490 includes a first motor cap 498 and a second motor cap 500, which are fixed to the housing 490. The stator 494 is attached to the housing 490 and the rotor 496 is connected to the motor shaft 473. During operation of the motor 488, the rotor 496 spins relative to the stator 494, which causes the motor shaft 473 to spin.

The first motor cap 498 may include a bearing 504, such as a ball bearing, that interfaces between the first motor cap 498 and the motor shaft 473. The bearing 504 enables the motor shaft 473 to spin relative to the first motor cap 498 without generating excessive friction. It is noted that the motor shaft 473 extends through the first motor cap 498.

The second motor cap 500 includes an adapter 509 that is adapted to receive the pulley shaft 456 in one end and the motor shaft 473 on the other end. The adapter 506 of the second motor cap 500 is attached to the pulley shaft by a pin 508 or other device. Thus, the housing 490 of the motor 488 is maintained stationary relative to the pulley shaft 456. A bearing 512, such as a ball bearing, interfaces between the adapter 506 and the motor shaft 454, which enables the motor shaft 473 to spin relative to the adapter 506 without generating excessive friction.

A first fan 516 and a second fan 518 may be attached to the motor shaft 473. The fans 516, 518 may be, as examples, radial fans as shown in FIG. 14. It is noted that other fan configurations, such as axial fans, may be use within the pulley 450. In the embodiment of the pulley 450 of FIG. 16, the fans 516, 518 are located in close proximity to the stator 494 and rotor 496, which increases the cooling abilities of the fans 516, 518. In other embodiments, the fans 516, 518 may be located in other areas in the tube 454. The fans 516, 518 serve to direct air past and/or through the motor 488 in order to cool the motor 488. In one embodiment, the fans 516, 518 circulate air over portions of the motor indicated by reference numerals 520 and 524.

The pulley 450 may also include fan housings, which are referenced as a first fan housing 528 and a second fan housing 530. The fan housings 528, 530 may be integral to the motor housing 490 and may be similar or identical to the extension piece 446 of FIG. 15. The fan housings 528, 530 may include a plurality of air holes 534 that facilitate the air flow generated by the fans 516, 518. In one embodiment, the holes 534 are oval shaped as shown in FIG. 15. The air flow generated by the fans 516, 518 may extend between the first and second end housings 460, 462. In other embodiments, the air flow may extend between one or both end housings and holes (not shown) formed in the tube. For example, holes may be formed proximate one or both fans 516, 518.

In another embodiment, the air flow is indicated by numeral 540. With reference to the first fan 516, air is sucked from an area proximate the first end housing 460. Some of the air enters the portion 520 of the motor 488. The first fan 516 creates a vacuum in area 520, which causes the air to be exchanged. Thus, the motor 488 is cooled. The first fan 516 exhausts the air proximate the tube 454, where it passed proximate the first end housing 460. The dividers 467, FIG. 8, cause an exchange of air outside and inside the tube 454. Thus, cooler air from outside the tube may enter and follow the air path 540. Simultaneously, the hot air exhausted by the first fan 516 may exhaust from the tube 454. The cooling with reference to the second fan 518 may function in a similar manner. It is noted that the air flow may also pass between the tube 454 an the rotor 496, which improves the cooling of the motor 488.

It is noted that the pulley 450 is an example of an embodiment of a motorized, air-cooled pulley and that other embodiments exists. For example, the pulley 450 may have a single fan or a plurality of fans rather than the two fans 516, 518 shown in FIG. 4. In other embodiments the fan or fans may be located at different areas within the tube 454. For example, a fan may be located proximate an end housing.

Having described embodiments of the pulley 450, the operation of the pulley 450 will now be described. In summary, the pulley 450 operates by rotating the tube 454 relative to the pulley shaft 456. The pulley 450 may be mounted to a frame (not shown in FIG. 13) or other stable structure, such as the wall 114, FIG. 1. More specifically, the shaft 482 and the pulley shaft 456 (or device attached thereto) may be fastened to a frame or other stable structure. Because the pulley 450 is air-cooled, it can be mounted vertically, unlike conventional oil-cooled pulleys that do not operate well in a vertical position. Oil-cooled pulleys tend to leak when mounted vertically.

Power is applied to the motor 488 by way of the cable 470, which causes the rotor 496 to spin relative to the stator 494. Because the stator 494 is stationary or otherwise secured to a frame, the rotor 496 spins, which causes the motor shaft 473 to spin. The first end housing 460 is attached to the motor shaft 473 via the shaft adapter 474, therefore, the tube 454 spins as the motor shaft 473 spins. Thus, the dividers 467, FIGS. 17 and 18, also spin. The fans 516, 518 are attached to the motor shaft 473, so they spin as the motor shaft 473 spins. Accordingly, the spinning fans 516, 518 circulate air to cool the motor 488 while the motor 488 is operating by way of the above described air paths.

Conveyor System

Having described the ball units and pulleys and having briefly described the conveyor system 100, FIG. 1, the conveyor system 100 will now be described in greater detail. It is noted that the accelerator 130 will be described in detail further below. The following description is based on FIG. 22, which is a plan view of an embodiment of the conveyor system 100 without the accelerator 130.

As described above, the pulley 124 may be used in a conveyor system to transport items, such as production goods. In one embodiment, a plurality of pulleys 124 are used to transport items traveling in a first direction to a second direction. The conveyor system 100, and more particularly, the curved portion 110, changes the direction of movement of items 750 from a first direction 127 to a second direction 128.

Figure 22:
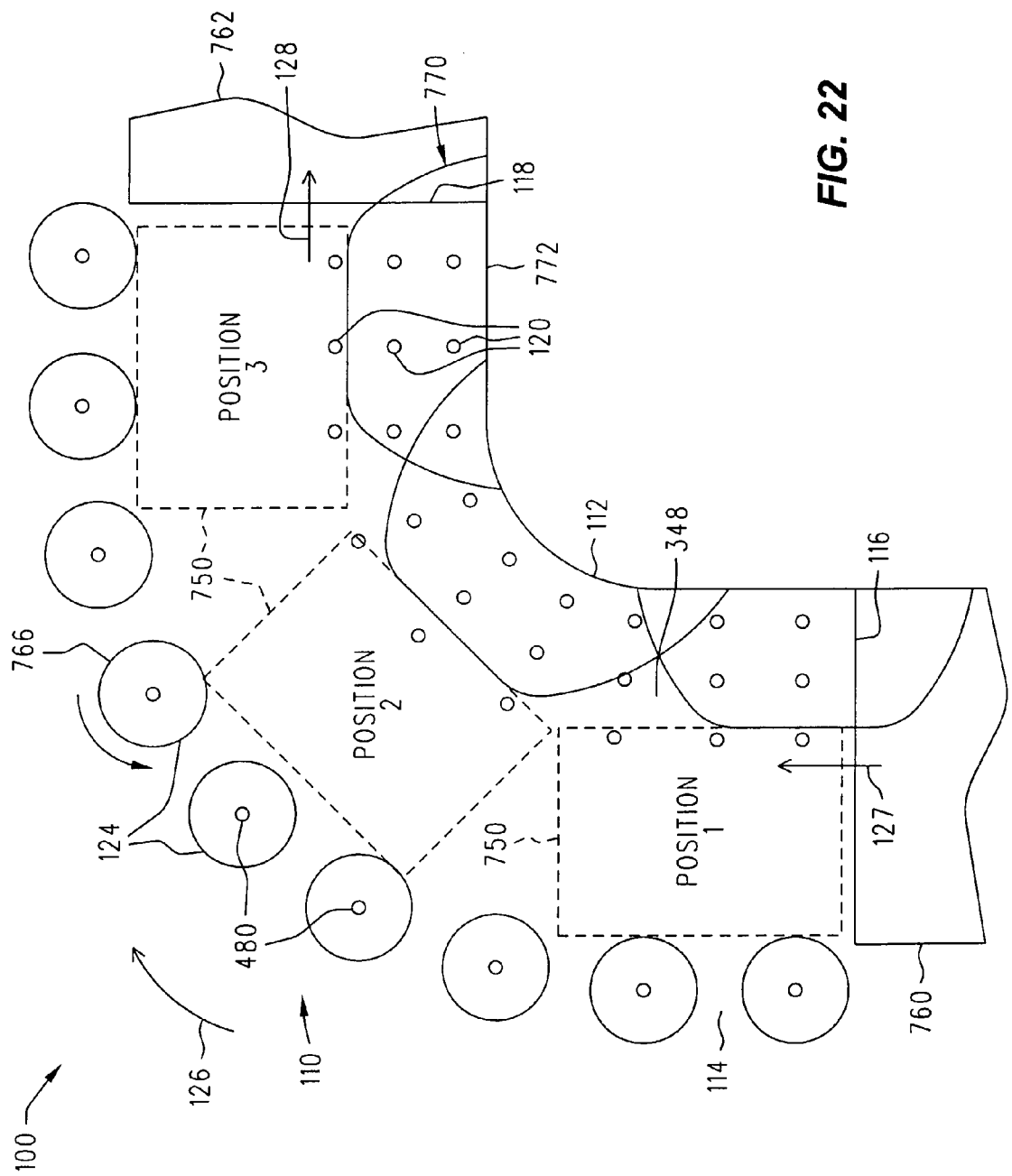
FIG. 22 is a top plan view of an embodiment of a conveyor system.

The conveyor system 100, as shown in FIG. 22, is associated with a first conveyor 760 that receives articles traveling in the first direction 127. The curved portion 110 changes the direction of the items 750 to the second direction 128 for delivery to a second conveyor 762. The first conveyor 760 may be the accelerator 130 of FIG. 1.

The curved portion 110 includes the plurality of pulleys 124 that are mounted vertically. The pulleys 124 may be mounted so as to form an arc or curve, which defines the arcuate path 126. The placement of the pulleys 124 defines the radius of the arcuate path 126. In one embodiment, thirty-one pulleys 124 are used in the curved portion 110. In order to improve the illustration of the curved portion 110, fewer pulleys 124 are shown in FIG. 22. In operation, at least one pulley, which is referenced as pulley 766 spins so as to cause the items 750 to move. In the embodiment described in FIG. 22, the pulley 750 and any other spinning pulley are spinning in a counter-clockwise direction.

It is noted that the radius of the arc and the diameters of the pulleys 124 may be selected so as to cause minimal interference with the items 750 as they travel along the curved portion 110. For example, the radius and diameters may be selected so as to cause the items 750 to contact the pulleys 124 in a surface that is substantially parallel to the directions of the items 750. Thus, the items 750 will be propelled by the pulleys 124 rather than colliding with the pulleys 124.

Referring briefly to FIG. 1, the curved portion 110 may include a frame 768 or the like to which the pulleys 124 are attached. More specifically, the pulley shafts 456 and/or shaft caps 480 may be attached to the frame 768. This attachment enables the pulleys 124 to spin relative to the frame 768. For illustration purposes, the frame has not been included in FIG. 22.

In operation, items 750 traveling in the first direction 127 on the first conveyor 760 contact the surface 348 of the platform 112. The ball units 120 cause the items 750 to undergo minimal reductions in velocity during the period that they are over the surface 348. The items 750 also contact the spinning pulleys 124, which facilitate the items 750 in maintaining, increasing, or possibly decreasing their velocity. The configuration of the pulleys 124 in the arc causes the items 750 to change direction from the first direction 127 to the second direction 128. The change in direction is shown by the dashed items 750 moving between position one and position three. After the items 750 have changed direction to the second direction 128, they are moved by the second conveyor 762, which moves the items 750 in the second direction 128.

As briefly stated above, at least one of the pulleys 124 may be spinning at the time an item 750 enters the curved portion 110. The speed at which the pulleys 124 spin may determine the speed of the items 750 when they exit the curved portion 110. For example, the speed of the pulleys 124 may be faster than the speed of the items 750 when the items 750 enter the curved portion 110. The pulleys 124 may then serve to accelerate the items 750. Likewise, the speed of the pulleys 124 may be slower than the speed of the items as they enter the curved portion 110. In some embodiments, the pulleys 124 or at least one pulley operates at the same speed as the items 750 entering the curved portion 110. At least one pulley may be a motorized pulley as described above, the remaining pulleys may be simple pulleys without motors. For example, the pulleys 124 located on the wall 114 may alternate between motorized and non-motorized pulleys. The reduced number of motorized pulleys decreases the cost of the conveyor 100.

In some embodiments, the conveyor 100 may have a plurality of flexible bands 770 extending from a frame 772. During operation of the conveyor 100, the items 750 contact the bands 770 in addition to the pulleys 124. The bands 770 cause the items to be pressed against the pulleys 124, which keeps the items 750 from bouncing off the pulleys 124. By maintaining the items 750 against the pulleys 124, the velocities of the items are maintained more constant as they travel through the curved portion 110 of the conveyor 100. More specifically, the velocities of the items 750 more closely match the velocities of the spinning pulleys 124 because they are forced against the spinning pulleys 124. The bands may be made of a polymer or other material that flexes and is able to withstand the impact of the items 750 as they enter the curved portion 110 of the conveyor 100.

Figure 23:
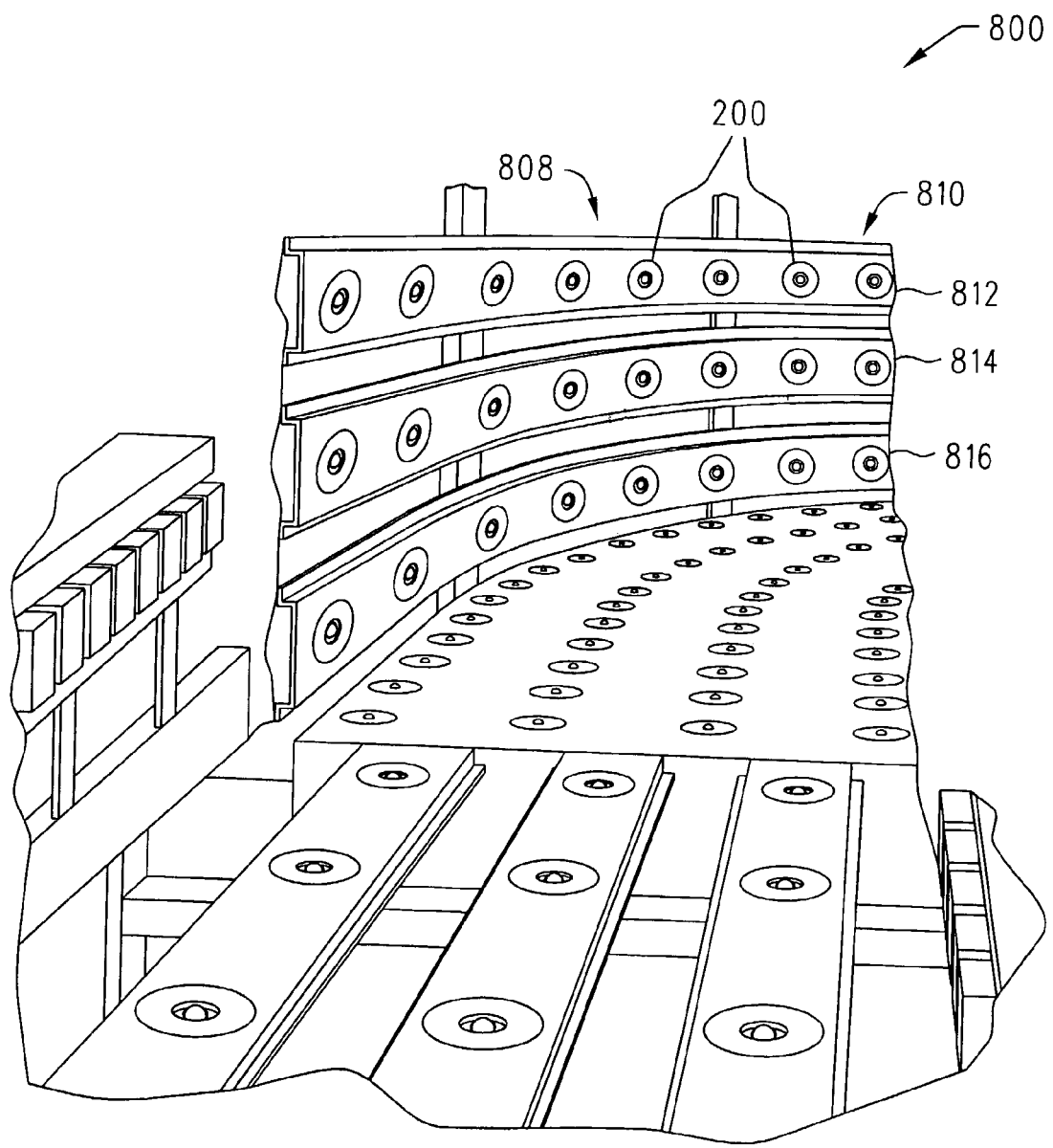
FIG. 23 is a side perspective view of an embodiment of a conveyor system.

Another embodiment of a conveyor 800 is shown in FIG. 23. The conveyor 800 may include an outer guide 808 and an inner guide, not shown. The outer guide 808 may include a plurality of rails 810, wherein the embodiment of FIG. 23 includes a first rail 812, a second rail 814, and a third rail 816. The use of three rails 810 is for exemplary purposes and it is noted that the conveyor 800 may include more or less than the three rails described herein. It is noted that the conveyor 800 is substantially similar to the conveyor 100 of FIGS. 1 and 22 except that the conveyor 800 has the rails 810 instead of the pulleys 124. As with the conveyor 100 of FIG. 1, the conveyor 800 may provide different arcs and different radii in the curve.

The outer guide rails 810 include a plurality of ball units 200. The ball units 200 are the same ball units 200 as described above. The ball units 200 mounted on the rails 800 serve to reduce the friction between items being conveyed on the conveyor 100 and the outer rail 808. The items may exert a centripetal force on the outer rail 808. Balls within the ball units 200 are forced outward by air so that the items contact the balls, is which reduces the friction between the items and the outer rail 808. The reduced friction results in the velocities of items being conveyed by the conveyor 100 being more predictable.

It is noted that the placement and number of ball units 200 in the rails 808 may vary depending on the size and shape of the items being transported by the conveyor. The placement of the ball units 200 in the rails 808 may serve to minimize the contact between the items and the portions of the rails 808 between the ball units 200. If large items are being conveyed, the distance between the ball units 200 may be large. Likewise, if small items are being conveyed, the distance between the balls 200 may be small. In addition, the size and number of ball units 200 may vary depending on the radius of the curve of the conveyors.

The conveyors 100 and 800 serve to change the direction of items being conveyed with minimal impact on their velocities. More specifically, the velocities of the articles is known more accurately than in conventional conveyor systems. Items conveyed via conventional conveyors typically undergo unknown velocity changes when being conveyed around a curve. Thus, the spacing between conveyed items has to be large so that they will not impact. More specifically, the spacing has to be great enough so that a second conveyed item does not impact a previously conveyed item. Such an impact may damage either item or cause either item to fall off the conveyor system. The conveyors 100, 800 disclosed herein enable a the items being conveyed to be closer together because their velocities are known throughout the curved portion of the conveyors 100, 800. Thus, more times per time period are able to be transported. In addition, the conveyors 100, 800 enable items to be transported faster than conventional conveyors.

It is noted that the conveyors 100, 200 have been described using the ball units 200 in curved sections. It is to be understood, however, that the ball units may be used in straight conveyor systems.

Accelerator

Referring to FIG. 1, the accelerator 130 is an example of a conveyor system using the ball units 120. The accelerator 130 controls the flow of items in a conveyor system. The control may include accelerating items, spacing between items in a conveyor system, and even decelerating items. The accelerator 130 is described with additional reference to FIG. 24, which is a plan view of the accelerator 130. In summary, the items located on the accelerator sit on ball transfer devices and are moved via belts or the like.

The accelerator 130 includes two racks, which are referenced individually as the first rack 830 and the second rack 832. As shown in FIG. 1, the first rack 830 has a cover 834 located thereon. One or both of the racks 830, 832 may move toward the other rack in directions shown by the axis 838. As described in greater detail below, the movement enables the racks or devices located thereon to more readily contact and move items on the accelerator 130. The movement may be achieved by virtually any means including mounting one or both racks 830, 832 on slides wherein hydraulic devices move the racks 830, 832. Thus, the racks 830, 832 may be quickly moved depending on the size of items being conveyed.

The embodiment of the rack 830 shown in FIG. 1 includes an upper rail 840 and a lower rail 842. As described in greater detail below, components associated with the upper rail 840 may move items and the lower rail 842 may serve to keep the items from falling off the accelerator 130.

Figure 24:
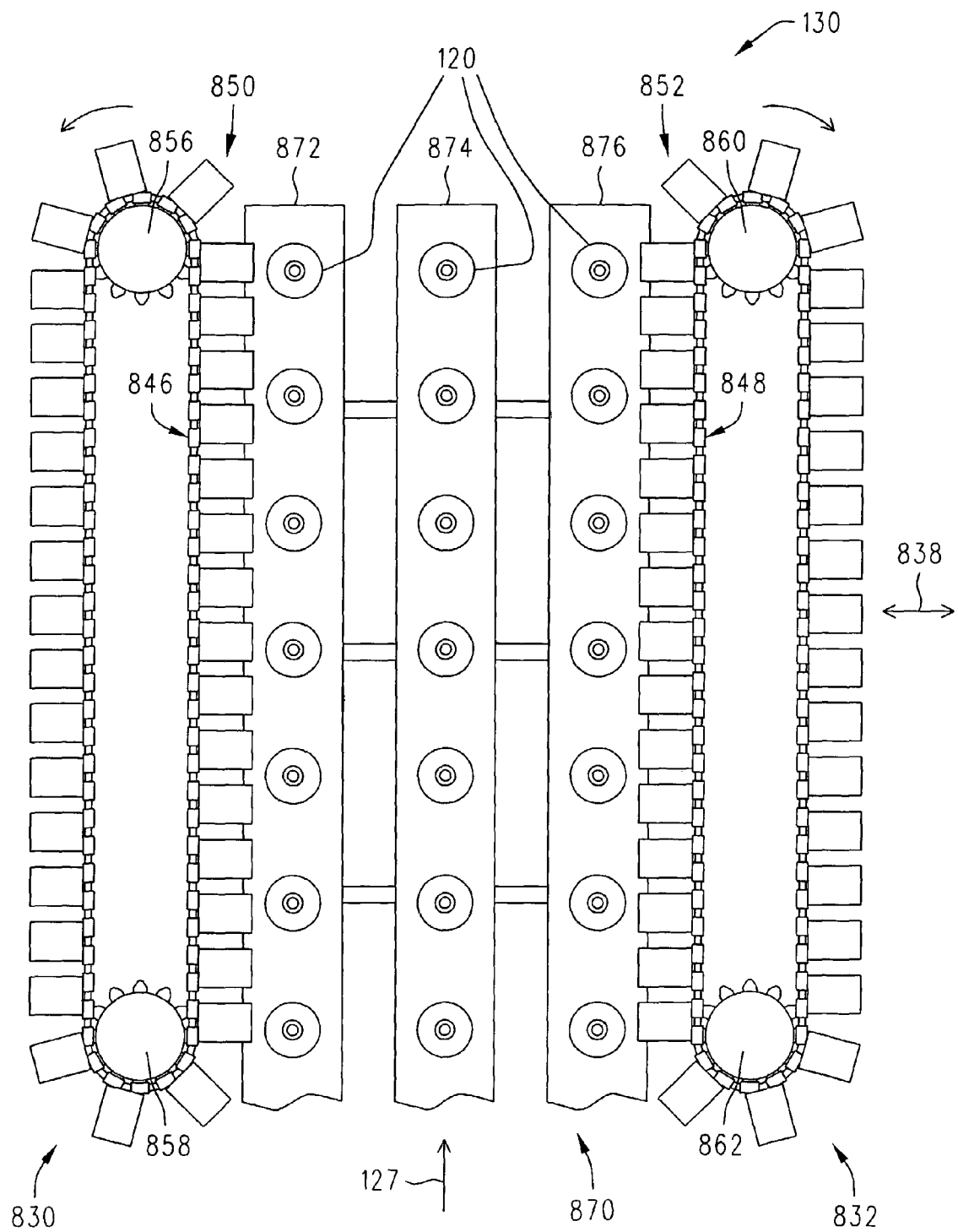
FIG. 24 is a top plan view of the accelerator of FIG. 1.

The embodiment of the accelerator 130 shown in FIG. 24 does not include the covers 834 of FIG. 1. Thus, the internal components of the accelerator are visible. Each rail of the accelerator 130 includes a chain, which are referred to individually as the first chain 846 and the second chain 848. Each of the chains 846, 848 has a plurality of friction devices attached thereto. The function devices attached to the first chain 846 are referred to as the first friction devices 850 and the friction devices attached to the second chain are referred to as the second friction devices 852. The friction devices serve to contact and move items along the accelerator 130 without damaging the items. The function devices may be made of a compressible material, such as rubber, which enables the friction devices to contact and move the items without damaging them. The friction devices 850, 852 are depicted as being substantially rectangular. However, the friction devices 850, 852 may have other shapes. For example, they may points wherein the pointed portions contact the items being conveyed.

The chains 846, 848 are moved via a plurality of sprockets, which are referenced by numerals 856, 858, 860, 862. The first chain 846 rotates around the pulleys 856 and 858. During operation, the pulleys 856 and 858 may spin counter-clockwise, which causes the friction devices 850 that contact an item to move in the direction 127. The second chain 848 rotates around the pulleys 860 and 862. During operation, the pulleys 860 and 862 may rotate clockwise, which causes the friction devices 852 that contact the items to move in the direction 127.

The pulleys 856, 858, 860, 862 may be driven by one or more motors (not shown). In some embodiments one pulley associated with either the first chain 846 or the second chain 848 has a motor connected thereto. For example, a motor may be connected to the pulley 856, which drives the first chain 846. Items are then conveyed by the moving first chain 846. The second chain 848 may move by way of contact with items. In some embodiments, a smooth surface may be used instead of the second chain 852. In other embodiments, one pulley on each chain may be driven. For example, both the pulleys 856 and 860 may be driven by one motor or one motor connected to each pulley.

The items being conveyed set on a platform. In the embodiment of the conveyor 130 shown in FIG. 24, the platform is a plurality of rails 870. Three rails 870 are shown in FIG. 24 and are referred to as the first rail 872, the second rail 874, and the third rail 876. It is noted that more or less rails 870 may be used in other embodiments. The rails include a plurality of ball units 120, which function in the same manner as described above. As also described above, the number and arrangement of ball units 120 depends on the application of the accelerator 130.

In use, items are conveyed on the rails 870 by the chains 846, 848. As the chains 846, 848 move, the friction devices 850, 852 contact the items, which causes the items to move. The ball units 120 serve to reduce friction between the items and the rails 870, which enables the accelerator 130 to cause the items to be conveyed at a relatively high velocity. In some embodiments, the items are conveyed at a velocity of approximately 3000 feet per minute. It is noted that items may be conveyed faster or slower than 3000 feet per minute. As set forth above, the friction units 850, 852 may contact the items being conveyed by moving the racks 830, 832 in the direction 838. In some embodiments, the size of the items are measured and the and the racks 830, 832 are moved accordingly.

The accelerator 130 may also stagger items by slowing down the velocity of items and then accelerate them to a higher velocity at a later time. Thus, actions taken on other items on another portion of the conveyor system can be accomplished while items wait in the accelerator 130. When the actions are complete, the accelerator can rapidly convey the items through the conveyor system.

The invention claimed is:

1. A ball transfer device comprising:
   a chamber;
   a first opening extending into said chamber;
   a second opening extending into said chamber;
   a ball, wherein said ball is movable within said chamber between a first position and a second position, wherein a portion of said ball is movable into said first opening when said ball is in said first position; and
   a first bearing located proximate said first opening, wherein said ball is contactable with said first bearing, wherein said first bearing comprises a hole located adjacent said second opening and wherein said ball is receivable in said hole;
   wherein said ball is located between said first opening and said second opening.

2. The ball transfer device of claim 1, wherein said second opening is connectable to a fluid supply.

3. The ball transfer device of claim 2, wherein said fluid is air.

4. The ball transfer device of claim 1, wherein a positive fluid pressure is maintainable between said ball and said second opening.

5. The ball transfer device of claim 1, wherein said ball is movable into said first opening and wherein a greater portion of said ball is located in said first opening when said ball is in said first position than when said ball is in said second position.

6. The ball transfer device of claim 1, wherein said first bearing comprises wood.

7. The ball transfer device of claim 1, wherein said first bearing comprises oil impregnated wood.

8. The ball transfer device of claim 1, wherein said first bearing has a recessed portion connected to said hole, and wherein said recessed portion is configured to receive said ball.

9. The ball transfer device of claim 1, and further comprising a second bearing located within said chamber, wherein said ball is located between said first bearing and said second bearing.

10. The ball transfer device of claim 9, wherein said second bearing comprises wood.

11. The ball transfer device of claim 10, wherein said second bearing comprises oil impregnated wood.

12. The ball transfer device of claim 9, wherein said second bearing has a hole located therein and wherein said ball is receivable in said hole when said ball is in said second position.

13. The ball transfer device of claim 1, and further comprising material located proximate said first opening, wherein said material contacts said ball when said ball is in said first position and said second position.

14. The ball transfer device of claim 13, wherein said material has a hole located therein, said hole being adjacent said first opening and wherein said ball is located within said hole.

15. A ball transfer device comprising:
   a chamber;
   a first opening into said chamber;
   a second opening into said chamber;
   a ball located in said chamber and positionable between a first position and a second position, wherein a portion of said ball extends through said first opening when said ball is located in said first position;
   a first annular bearing located proximate said first opening, wherein said first annular bearing has a hole extending therethrough and wherein said ball is receivable within said hole;
   a second annular bearing having a hole located therein, wherein said ball is moveable between said first annular bearing and said second annular bearing and wherein said ball is receivable within said hole.

16. A conveyor comprising:
   a platform comprising at least one hole located therein;
   a ball transfer device located in each of said at least one hole, said ball transfer device comprising:
   a chamber;
   a first opening extending into said chamber;
   a second opening extending into said chamber;
   a ball, wherein said ball is movable within said chamber between a first position and a second position, wherein a portion of said ball is extendable through said second opening when said ball is in said first position, wherein said ball is located between said first opening and said second opening; and
   a second bearing located within said chamber, wherein said ball is located between said first bearing and said second bearing.

17. The conveyor of claim 16, and further comprising a first bearing located proximate said first opening, wherein said ball is contactable with said first bearing.

18. The conveyor of claim 17, wherein said first bearing comprises wood.

19. The conveyor of claim 16, wherein said second bearing comprises wood.

20. The conveyor of claim 16, and further comprising a wall extending substantially perpendicular to said platform, wherein at least one pulley is located in said wall.

21. The conveyor of claim 20, wherein said at least one pulley is motorized.

* * * * *